United States Patent
Furutani et al.

(10) Patent No.: US 10,133,106 B2
(45) Date of Patent: Nov. 20, 2018

(54) DISPLAY DEVICE

(71) Applicant: Japan Display Inc., Tokyo (JP)

(72) Inventors: Naosuke Furutani, Tokyo (JP); Atsushi Nakamura, Tokyo (JP); Osamu Ishige, Tokyo (JP); Koji Noguchi, Tokyo (JP); Chihiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 466 days.

(21) Appl. No.: 14/935,613

(22) Filed: Nov. 9, 2015

(65) Prior Publication Data
US 2016/0131931 A1 May 12, 2016

(30) Foreign Application Priority Data

Nov. 11, 2014 (JP) .................................. 2014-229291

(51) Int. Cl.
*G02F 1/1335* (2006.01)
*G02F 1/1333* (2006.01)
*G06F 3/044* (2006.01)

(52) U.S. Cl.
CPC .... *G02F 1/13338* (2013.01); *G02F 1/133502* (2013.01); *G02F 1/133504* (2013.01); *G06F 3/044* (2013.01)

(58) Field of Classification Search
CPC ...................... G02F 1/133308; G02F 1/133608
See application file for complete search history.

(56) References Cited

U.S. PATENT DOCUMENTS

| | | | |
|---|---|---|---|
| 9,378,699 B2 | 6/2016 | Matsumoto et al. | |
| 2009/0122410 A1* | 5/2009 | Tamura | C08L 83/10 359/601 |
| 2011/0123777 A1* | 5/2011 | Imaoku | G02B 1/118 428/172 |
| 2013/0222720 A1* | 8/2013 | Tanihara | G02F 1/1333 349/15 |
| 2016/0266714 A1 | 9/2016 | Matsumoto et al. | |

FOREIGN PATENT DOCUMENTS

| | | |
|---|---|---|
| JP | 04175727 | 6/1992 |
| JP | 2003005662 | 1/2003 |
| JP | 2008083491 | 4/2008 |
| JP | 2012-022844 | 2/2012 |
| JP | 2013-246610 | 12/2013 |
| JP | 2013254142 | 12/2013 |
| JP | 2014-029614 | 2/2014 |

OTHER PUBLICATIONS

Notification of Reasons for Rejection dated Apr. 24, 2018 in corresponding Japanese Application No. 2014-229291.

* cited by examiner

*Primary Examiner* — Phu Vu

(74) *Attorney, Agent, or Firm* — K&L Gates LLP

(57) ABSTRACT

An image quality of a display device is improved. The display device includes: a display unit having a display functional layer; a cover member having a front surface and a back surface positioned on an opposite side of the front surface and covering the display unit; and a polarizing plate having a front surface so as to oppose the back surface of the cover member through a space spreading along the back surface of the cover member. Also, a reflection suppressing layer reducing reflected light which is visually recognized on the display surface side is formed on either one of the back surface of the cover member and the front surface of the polarizing plate.

19 Claims, 17 Drawing Sheets

FIG. 15

| plot number | | CP | EP1 | EP2 | EP3 | EP4 | EP5 | EP6 |
|---|---|---|---|---|---|---|---|---|
| surface treatment | CVf | HC | HC | HC | HC | HC | HC | AG1 |
| | CVb | HC | AG1 | HC | HC | HC | AG1 | HC |
| | PL1f | HC | HC | AG1 | AR3 | AG2 | AG1 | AG1 |
| thickness [mm] | TH2 | 2.0 | 2.0 | 2.0 | 2.0 | 2.0 | 2.0 | 2.0 |
| | TH1 | 0.3 | 0.3 | 0.3 | 0.3 | 0.3 | 0.3 | 0.3 |
| Newton's rings | | × | △ | ○ | △ | ○(◎) | ◎ | ○ |

| plot number | | EP7 | EP8 | EP9 | EP10 | EP11 | EP12 |
|---|---|---|---|---|---|---|---|
| surface treatment | CVf | AR1 | AR2 | AR3 | AR1 | AG1 | HC |
| | CVb | AR1 | AR2 | AR3 | AR1 | HC | AG1 |
| | PL1f | AR1 | AR2 | AR3 | AG1 | AG2 | AR1 |
| thickness [mm] | TH2 | 2.0 | 2.0 | 2.0 | 2.0 | 2.0 | 2.0 |
| | TH1 | 0.3 | 0.3 | 0.3 | 0.3 | 0.3 | 0.3 |
| Newton's rings | | △ | ○ | ◎ | ○ | ◎ | △(○) |

| plot number | | EP13 | EP14 | EP15 | EP16 |
|---|---|---|---|---|---|
| surface treatment | CVf | HC | HC | AR1 | AR1 |
| | CVb | AG1 | AG1 | AR1 | AR1 |
| | PL1f | AG1 | AG1 | AR1 | AR1 |
| thickness [mm] | TH2 | 2.0 | 2.0 | 1.0 | 1.5 |
| | TH1 | 0.1 | 1.0 | 0.3 | 0.3 |
| Newton's rings | | ◎ | ◎ | △ | △ |

DISPLAY DEVICE

CROSS REFERENCES TO RELATED APPLICATIONS

The present application claims priority to Japanese Priority Patent Application JP 2014-229291 filed in the Japan Patent Office on Nov. 11, 2014, the entire content of which is hereby incorporated by reference.

TECHNICAL FIELD OF THE INVENTION

The present invention relates to a display device, and, for example, relates to a technique effectively applied to a display device in which a display surface side of a display unit is covered with a cover member and a space is formed between the cover member and the display unit.

BACKGROUND

For example, Japanese Patent Application Laid-Open Publication No. 2014-29614 (Patent Document 1) and Japanese Patent Application Laid-Open Publication No. 2012-22844 (Patent Document 2) describe stacking of a hard coat layer and an antireflection layer on a capacitance-type touch panel.

Also, Japanese Patent Application Laid-Open Publication No. 2013-246610 (Patent Document 3) describes a touch panel having an antireflection film formed on a display surface side of a cover glass and having a touch panel electrode formed on a surface on the opposite side of the display surface.

SUMMARY

A display unit in a display device includes: for example, a display functional layer such as a liquid crystal layer or a luminescent layer using electroluminescence; and a plurality of display elements such as transistors, and transits a signal to the plurality of display elements and drives the display elements, so that an image is displayed. Also, in some cases, a display surface side of the display unit is covered with a cover member, and a space is provided between the cover member and the display unit. The present inventors of the present application have studied a display device having a space provided between the cover member and the display unit as described above, and have found out the following problems.

That is, when the cover member is locally elastically deformed in a case of the above-described display device, it has been found out that the periphery of the elastically-deformed portion is not correctly displayed in some cases. For example, in a case of a display device including, for example, an input device referred to as a so-called touch panel, the cover member is locally elastically deformed in some cases when an input operation is performed with a finger or others. In this case, annular interference patterns called Newton's rings are visually recognized in the periphery of the elastically-deformed portion.

The Newton's rings disappear if the elastically-deformed portion of the cover member is restored. However, from the viewpoint of improving the image quality of the display device, it is preferred not to visually recognize the Newton's rings even in the elastically-deformed state of the cover member.

An object of the present invention is to provide a technique for improving an image quality of a display device.

A display device according to an aspect of the present invention includes: a display unit having a display functional layer; a cover member having a first surface and a second surface positioned on the opposite side of the first surface and covering the display unit; a first member having a third surface facing the second surface of the cover member via a first space spreading along the second surface of the cover member; and an input unit that includes a plurality of detection electrodes and detects a change in electrical capacitance via the plurality of detection electrodes. A reflection suppressing layer, which reduces reflected light visually recognized on the display surface side, is formed on either one of the second surface of the cover member and the third surface of the first member.

Additional features and advantages are described herein, and will be apparent from the following Detailed Description and the figures.

BRIEF DESCRIPTION OF THE FIGURES

FIG. 15 is an explanatory diagram illustrating a relation between a method for a reflection suppressing processing on each surface of the cover member and a polarizing plate and the degree of actualization of Newton's rings;

DETAILED DESCRIPTION

Figure 1:
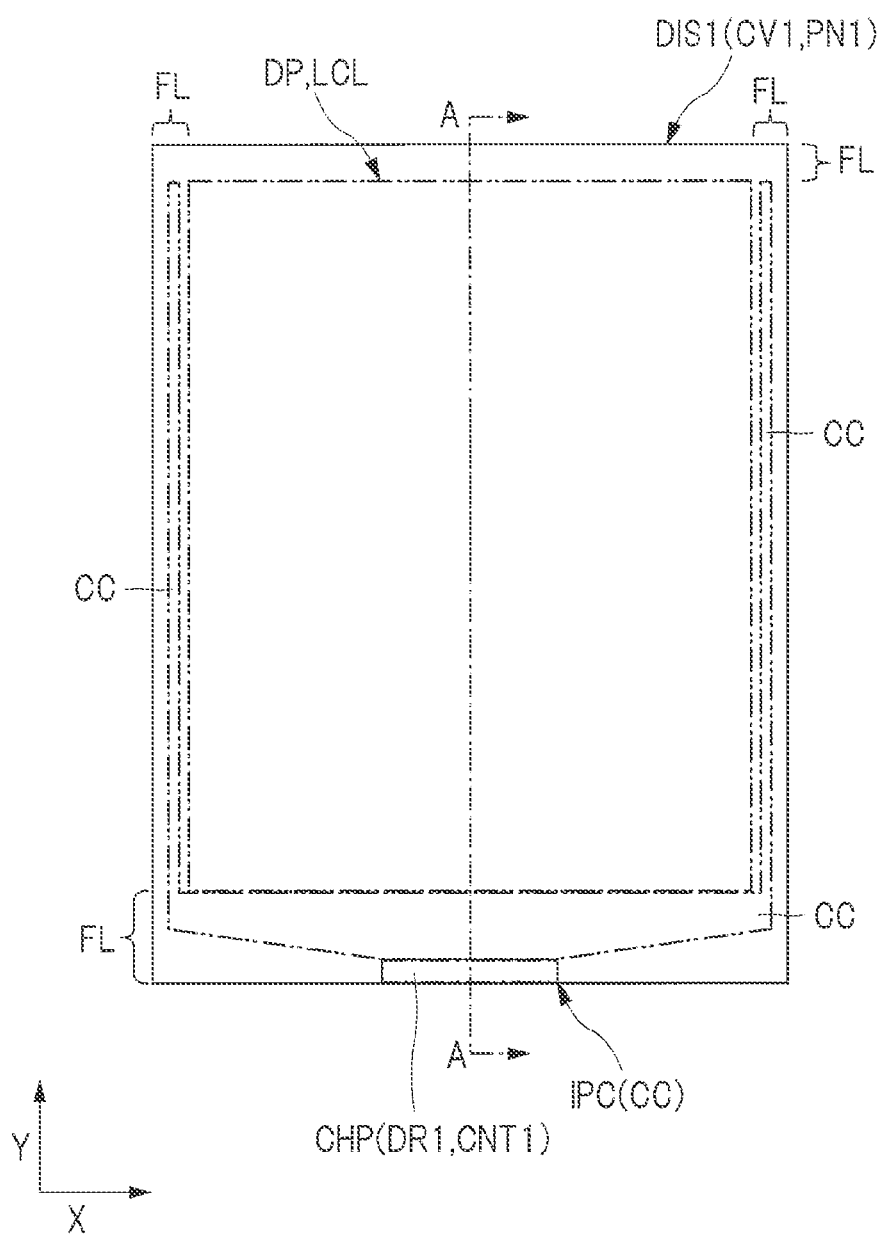
FIG. 1 is a plan view illustrating an example of a display device according to an embodiment.

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not restrict the interpretation of the present invention. In the present specification and each drawing, similar elements to those described earlier for the already-described drawings are denoted by the same or similar reference symbols, and detailed description for them is appropriately omitted in some cases.

And, a technique described in the following embodiments is also applicable to a display device including no input unit referred to as a so-called touch panel. However, the following embodiments will be explained by exemplifying a configuration of a display device with the input unit which has been studied by the inventors of the present application and whose problem has been found out, the problem causing the visual recognition of the Newton's rings by local deformation of a cover member.

And, a technique described in the following embodiments is widely applicable to a display device including a mechanism for feeding a signal from periphery of a display region to a plurality of elements in the display region provided with a display functional layer. As the display device as described above, various display devices such as a liquid crystal display, an organic electro-luminescence (EL) display device, and a plasma display device can be exemplified. In the following embodiments, the liquid crystal display device will be exemplified and explained as a typical example of the display device.

Also, the liquid crystal display is roughly classified into the following two categories depending on an application direction of an electric field used for changing an orientation of liquid crystal molecules of a liquid crystal layer serving as a display functional layer. That is, the first category is a so-called vertical electric field mode which applies an electric field in a thickness direction (or an out-of-plane direction) of the display device. The vertical electric field mode includes, for example, a TN (Twisted Nematic) mode, a VA (Vertical Alignment) mode, and others. The second category is a so-called horizontal electric field mode which applies an electric field in a plane direction (or an in-plane direction) of the display device. The horizontal electric field mode includes, for example, an IPS (In-Plane Switching) mode, a FFS (Fringe Field Switching) mode which is one type of the IPS mode, and others. While a technique described below is applicable to both of the vertical electric field mode and the horizontal electric field mode, the display device of the horizontal electric field mode will be exemplified and described as an example in the embodiment described below.

Basic Configuration of Display Device

Figure 2:
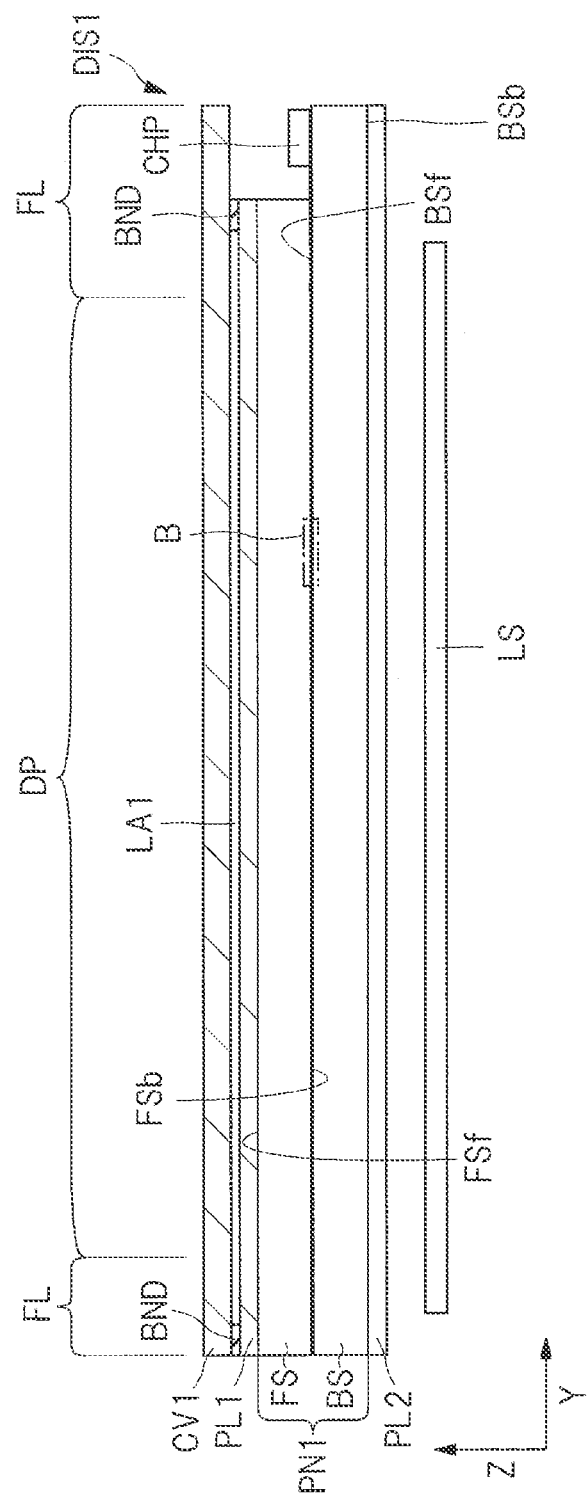
FIG. 2 is a cross-sectional view taken along a line A-A illustrated in FIG. 1.
Figure 3:
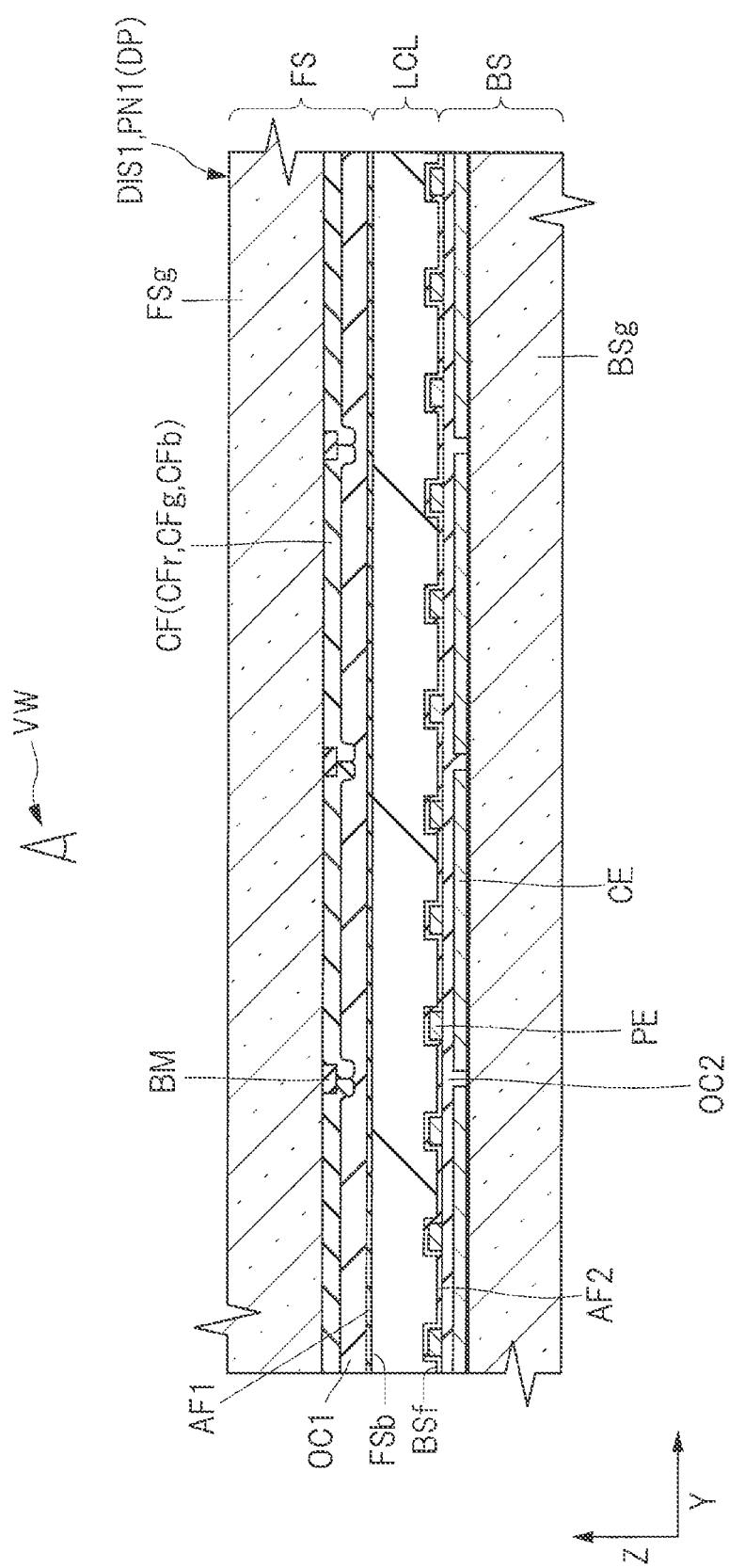
FIG. 3 is an enlarged cross-sectional view of a portion B illustrated in FIG. 2.

First, a basic configuration of a display device will be described. FIG. 1 is a plan view illustrating an example of a display device according to the present embodiment, and FIG. 2 is a cross-sectional view taken along a line A-A illustrated in FIG. 1. FIG. 3 is an enlarged cross-sectional view of a portion B illustrated in FIG. 2.

As illustrated in FIG. 2, a display device DIS1 according to the present embodiment includes: a display unit PN1 including a liquid crystal layer LCL (see FIG. 3) serving as a display functional layer; and a cover member CV1 covering a display surface side of the display unit PN1.

The display device DIS1 described as an example in the present embodiment is a liquid crystal display device as described above. The liquid crystal display device is not a self-luminous display device, and therefore, the display device DIS1 includes a light source LS. In an example illustrated in FIG. 2, the light source LS is provided on a back surface side positioned opposite to the display surface.

The display device DIS1 includes a polarizing plate PL1 and a polarizing plate PL2 that polarize light traveling from the light source LS toward the display surface side because of the liquid crystal display device. The display unit PN1 is provided between the polarizing plate PL1 and the polarizing plate PL2 that are arranged so as to face each other. In the example illustrated in FIG. 2, the polarizing plate PL1 is adhered on the display surface side of the display unit PN1, and the polarizing plate PL2 is adhered on the back surface side positioned on the opposite side of the display surface of the polarizing plate PL1. Also, in the example illustrated in FIG. 2, the cover member CV1, which covers the display surface side of the display unit PN1, is adhered on the polarizing plate PL1 through a bonding material BND which is provided along a peripheral edge of a first member arranged on an upper layer of the display unit PN1, i.e., along the polarizing plate PL1 in the present embodiment. If a past-like bonding material is used as the bonding material BND, note that the polarizing plate PL1 and the cover member CV1 are pasted to each other through the bonding material BND which has been applied along the peripheral edge of the polarizing plate PL1. Also, if a tape-like bonding material such as a so-called double-sided adhesive tape is used as the bonding material BND, the tape-like bonding material BND is previously pasted to at least one of the cover member CV1 and the polarizing plate PL1, and the polarizing plate PL1 and the cover member CV1 are pasted to each other through the bonding material BND.

If a self-luminous display unit such as an organic EL display panel or a plasma display panel is provided as a modification example of the present embodiment, it is not required to provide the light source LS. If the self-luminous display unit is provided, it is not required to provide the polarizing plate PL1 and the polarizing plate PL2. In this case, the cover member CV1 is adhesively fixed to another member (not illustrated) other than the polarizing plate PL1.

As illustrated in FIG. 1, the display unit PN1 includes a display region DP where an image, which can be visually recognized from outside in response to an input signal, is formed. In a planar view, the display unit PN1 includes a frame unit FL serving as a non-display region provided in a frame shape in periphery of the display region DP. Also in a planar view, the display unit PN1 includes a sealing unit formed in the frame unit FL. The sealing portion is formed to continuously surround the periphery of the display unit DP, and a substrate FS and a substrate BS illustrated in FIG. 2 are adhesively fixed to each other by a sealing material provided in the sealing unit.

In the example of the present embodiment, the display unit PN1 has a structure in which a liquid crystal layer serving as a display functional layer is formed between a pair of substrates arranged so as to face each other. That is, as illustrated in FIG. 3, the display unit PN1 includes a substrate FS on the display surface side, and a substrate BS positioned on the opposite side of the substrate FS, the liquid crystal layer LCL arranged between the substrate FS and the substrate BS. The liquid crystal layer LCL is sealed with the sealing portion provided so as to surround the periphery of the display region DP illustrated in FIG. 1.

A thickness of the liquid crystal layer LCL illustrated in FIG. 3 is extremely smaller than each thickness of the substrate FS and the substrate BS illustrated in FIG. 2. For example, the thickness of the liquid crystal layer LCL is about 0.4% to 5% of each thickness of the substrate FS and the substrate BS. In examples illustrated in FIGS. 3 and 4, the thickness of the liquid crystal layer LCL is, for example, about 3 µm to 4 µm.

The liquid crystal layer LCL provided in the display region DP illustrated in FIG. 1 operates for each pixel (specifically, sub-pixel) in response to a signal transmitted via a circuit unit CC provided in the frame unit FL. In the circuit unit CC that drives the display functional layer, a plurality of display elements are arranged at positions overlapping the display region DP. The plurality of display elements are provided in a matrix form for each pixel (specifically, sub-pixel), and perform a switching operation. In the present embodiment, the plurality of display elements are transistors called a TFT (Thin-Film Transistor) formed in the substrate BS.

The circuit unit CC that drives the display functional layer includes a signal input unit IPC that inputs a driving signal or a video signal to the plurality of display elements. In an example illustrated in FIG. 1, on the signal input unit IPC, a semiconductor chip CHP in which the driving circuit DR1 and the control circuit CNT1 for image display are formed is mounted.

As described above, the polarizing plate PL1 (see FIG. 2) and the polarizing plate PL2 (see FIG. 2) are adhesively fixed to the display surface side of the display unit PN1 and the back surface side on the opposite side of the display surface, respectively. More specifically, the polarizing plate PL2 is provided on a back surface BSb side of the substrate BS in the display unit PN1. The polarizing plate PL2 is adhesively fixed to the back surface BSb of the substrate BS through a bonding layer. On the other hand, the polarizing plate PL1 is provided on a front surface FSf side of the substrate FS. The polarizing plate PL1 is adhesively fixed to the front surface FSf of the substrate FS through a bonding layer.

Note that the basic components for forming the display image are exemplified and illustrated in FIG. 2. However, other components can be added in addition to the components illustrated in FIG. 2 as a modification example. For example, the display device DIS1 includes an input unit that detects a position of a finger or others on a display screen and inputs a control signal such as a command corresponding to a detection position, although details will be described below. In FIG. 2, a detection electrode for detecting the position of the finger or others can be formed between, for example, the substrate FS and the polarizing plate PL1 although the illustration is omitted.

As illustrated in FIG. 3, the display unit PN1 includes a plurality of pixel electrodes PE arranged between the substrate FS and the substrate BS and a common electrode CE arranged between the substrate FS and the substrate BS. The display unit PN1 according to the present embodiment is the display device in the horizontal electric field mode as described above, and therefore, each of the plurality of pixel electrodes PE and the common electrode CE is formed on the substrate BS.

The substrate BS illustrated in FIG. 3 has a base material BSg made of a glass substrate, and a circuit for image display is mainly formed therein. The substrate BS has a front surface BSf positioned on the substrate FS side and a back surface BSb positioned on the opposite side thereof (see FIG. 2). A device element such as a TFT and a plurality of pixel electrodes PE are formed in a matrix form on the front surface BSf side of the substrate BS.

An example illustrated in FIG. 3 shows the display unit PN1 in the horizontal electric field mode (specifically, FFS mode), and therefore, each of the common electrode CF and the pixel electrodes PE is formed on the front surface BSf side of the substrate BS. The common electrode CE is formed on a front surface side of the base material BSg included in the substrate BS, and is covered with the insulating layer OC2. The plurality of pixel electrodes PE are formed on the substrate FS side of the insulating layer OC2 so as to face the common electrode CE through the insulating layer OC2. Note that the example illustrated in FIG. 3 exemplifies and shows an aspect including the common electrode CE, the insulating layer OC2, and the pixel electrodes PE stacked in this order from the substrate BS side. However, the common electrode CE, the insulating layer OC2, and the pixel electrodes PE are merely examples, and have various modification examples. For example, a structure including the pixel electrodes PE, the insulating layer OC2, and the common electrode CE stacked in this order from the substrate BS side may be used.

The substrate FS illustrated in FIG. 3 is a substrate having a color filter CF forming a color display image formed in a base material FSg made of a glass substrate, and has a front surface FSf (see FIG. 2) serving as the display surface side and a back surface FSb positioned on the opposite side of the front surface FSf. The substrate having the color filter CF formed thereon as the substrate FS is referred to as an opposite substrate because it opposes a color filter substrate or a TFT substrate through a liquid crystal layer in distinction from the above-described TFT substrate. As a modification example of FIG. 3, note that a configuration in which the color filter CF is provided in the TFT substrate may be adopted.

In the substrate FS illustrated in FIG. 3, the color filter CF configured by periodically arranging color filter pixels CFr, CFg, and CFb in three colors of Red (R), Green (G), and Blue (B) is formed on one surface of the base material FSg made of, for example, the glass substrate. In the color display device, one pixel is configured so that sub-pixels in three colors such as Red (R), Green (G), and Blue (B) are taken as a set. The plurality of color filter pixels CFr, CFg, and CFb in the substrate FS are arranged at positions opposing to the sub-pixels having the pixel electrodes PE formed in the substrate BS.

A light shielding film BM is formed in each boundary among the color filter pixels CFr, CFg, and CFb in the respective colors. The light shielding film BM is referred to as a black matrix, and is made of, for example, a black resin. The light shielding film BM is formed by, for example, overlapping a plurality of types of color filters. The light shielding films BM are formed in a lattice form in a planar view. In other words, the substrate FS has the color filter pixels CFr, CFg, and CFb in the respective colors formed among the light shielding films BM formed in the lattice form.

The substrate FS has a resin layer OC1 covering the color filter CF. The light shielding film BM is formed in the boundaries among the color filter pixels CFr, CFg, and CFb in the respective colors, and therefore, an inner surface of the color filter CF is an uneven surface. The resin layer OC1 functions as a flattening film for flattening unevenness of the inner surface of the color filter CF. Alternatively, the resin layer OC1 functions as a protective film for preventing impurities from being diffused into a liquid crystal layer from the color filter CF. The resin layer OC1 is formed so as to contain a component to be cured by application of energy, such as a thermosetting resin component or a light curing resin component in its material, so that the resin layer OC1 can cure a resin material.

The liquid crystal layer LCL forming a display image is provided between the substrate FS and the substrate BS by application of a voltage for display between the pixel electrodes PE and the common electrode CE. The liquid crystal layer LCL modulates light that passes therethrough in accordance with a state of an applied electric field.

The substrate FS includes an oriented film AF1 covering the resin layer OC1 on the back surface FSb serving as an interface contacting the liquid crystal layer LCL. The substrate BS includes an oriented film AF2 covering the insulating layer OC2 and the plurality of pixel electrodes PE on the front surface BSf serving as an interface contacting the liquid crystal layer LCL. The oriented films AF1 and AF2 are films formed to uniform initial orientations of liquid crystals contained in the liquid crystal layer LCL.

A method for displaying a color image by the display unit PN1 illustrated in FIG. 3 is as, for example, follows. That is, light, which has been emitted from the light source LS (see FIG. 2), is filtered by the polarizing plate PL2 (see FIG. 2), and light, which passes through the polarizing plate PL2, is incident on the liquid crystal layer LCL. The light incident on the liquid crystal layer LCL is propagated in a thickness direction of the liquid crystal layer LCL (i.e., a direction from the substrate BS to the substrate FS) while changing a light polarization state depending on refractive index anisotropy (i.e., birefringence) of the liquid crystal, and is emitted from the substrate FS. At this time, a liquid crystal orientation is controlled by an electric field formed by applying a voltage to the pixel electrodes PE and the common electrode CE, and the liquid crystal layer LCL functions as an optical shutter. That is, in the liquid crystal layer LCL, light transmittance can be controlled for each of the sub-pixels. Light, which has reached the substrate FS, is subjected to color filtering processing (i.e., processing for absorbing light having a wavelength other than a predetermined wavelength) in the color filter formed in the substrate FS, and is emitted from the front surface FSf. The light emitted from the front surface FSf reaches an observer VW via the polarizing plate PL1.

Configuration of Input Unit

Figure 4:
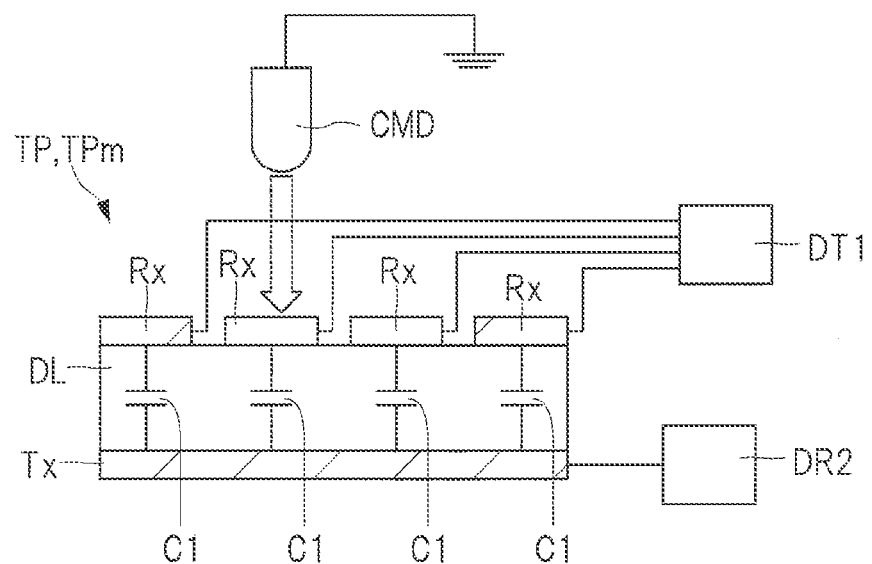
FIG. 4 is an explanatory diagram illustrating a schematic configuration of a touch panel serving as a capacitance-type input unit.
Figure 5:
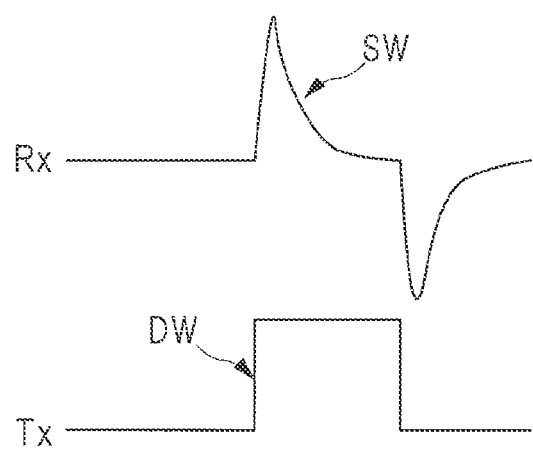
FIG. 5 is an explanatory diagram illustrating an example of a relation between a driving waveform to be applied to the touch panel illustrated in FIG. 4 and a signal waveform to be outputted from the touch panel.
Figure 6:
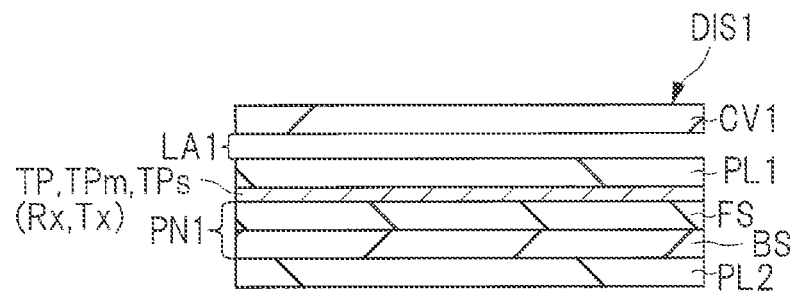
FIG. 6 is an explanatory diagram schematically illustrating a position at which an electrode for the input unit illustrated in FIG. 4 is provided in the display device illustrated in FIG. 1.
Figure 7:
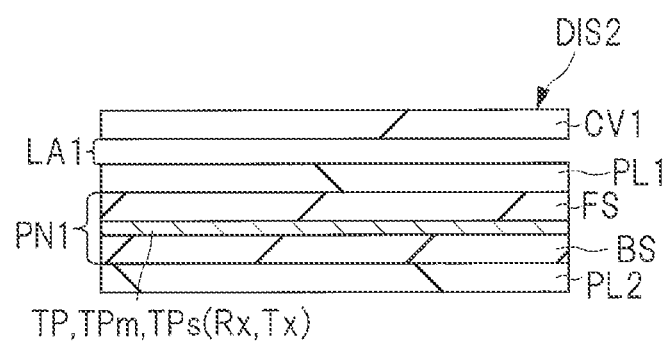
FIG. 7 is an explanatory diagram illustrating a modification example of FIG. 6.
Figure 8:
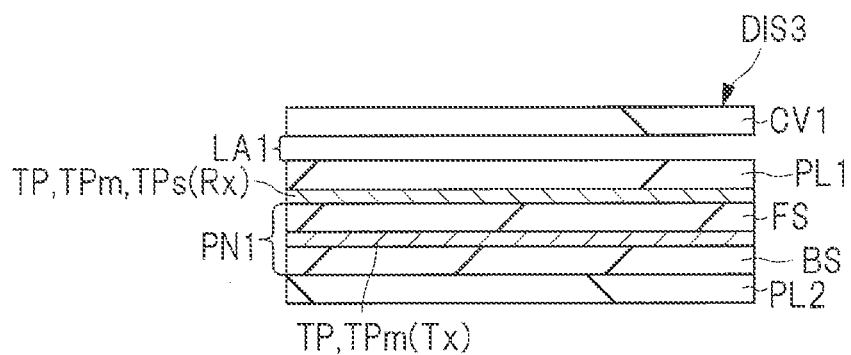
FIG. 8 is an explanatory diagram illustrating another modification example of FIG. 6.

Next, a configuration of an input unit included in the display device DIS1 according to the present embodiment will be described. FIG. 4 is an explanatory diagram illustrating a schematic configuration of a touch panel serving as a capacitance-type input unit. FIG. 5 is an explanatory diagram illustrating an example of a relation between a driving waveform to be applied to the touch panel illustrated in FIG. 4 and a signal waveform to be outputted from the touch panel. FIG. 6 is an explanatory diagram schematically illustrating a position at which an electrode for the input unit illustrated in FIG. 4 is provided in the display device illustrated in FIG. 1. FIGS. 7 and 8 are explanatory diagrams each illustrating a modification example of FIG. 6.

The display device DIS1 according to the present embodiment illustrated in FIGS. 1 and 2 includes a touch panel TP (see FIG. 4) serving as an input unit that detects a position of a finger or others on a display screen and inputs a control signal such as a command in response to the detection position. In an example illustrated in FIG. 4, the touch panel TP is a capacitance-type input unit that detects a position of an input tool CMD using a change in capacitance in periphery of a detection electrode Rx in approach of the input tool CMD.

As illustrated in FIG. 4, the capacitance-type touch panel TP includes a dielectric layer DL and a plurality of capacitative elements C1 each including a pair of electrodes oppositely arranged through the dielectric layer DL. A driving waveform DW which is, for example, a rectangular wave as illustrated in FIG. 5 is applied from a driving circuit DR2 for the input device to the driving electrode Tx configuring one of the pair of the electrodes. On the other hand, a current corresponding to, for example, the driving waveform DW as illustrated in FIG. 5 and capacitance of the capacitative element C1 illustrated in FIG. 4 flows from the detection electrode (input position detection electrode) Rx configuring the other of the pair of the electrodes, and then, a signal waveform SW is outputted therefrom. The signal waveform SW outputted from the detection electrode Rx is outputted to a detection circuit DT1 (see FIG. 4) that detects an input position.

The size of the signal waveform SW as exemplified in FIG. 5 is changed by the magnitude of an electric field which is expressed by a plurality of lines of electric force connecting the driving electrode Tx and the detection electrode Rx and which is generated when the driving waveform DW is applied to the driving electrode Tx.

Here, the input tool CMD serving as a capacitative element (dielectric body) whose one end is connected to a ground potential, such as a finger or a touch pen as illustrated in FIG. 4, is brought close to or into contact with one of the plurality of detection electrodes Rx in the touch panel TP. At this time, in the detection electrode Rx existing at a position close to the input tool CMD, the capacitance of the input tool CMD is added to the capacitive element C1. In this case, in periphery of the input tool CMD, the number of lines of electric force is relatively smaller than that in the other region. Therefore, the detection electrode Rx arranged at the position close to the input tool CMD outputs a smaller signal waveform SW than the signal waveform SW outputted from the detection electrode Rx arranged at the other position.

That is, the detection circuit DT1 illustrated in FIG. 4 can monitor the signal waveform SW transmitted from each of the plurality of detection electrodes Rx, and specify the position of the input tool CMD based on a value of the signal waveform SW or a change amount of the signal waveform SW. In other words, in the detection circuit DT1 included in the touch panel TP, the position of the input tool CMD is detected by detection of a change in electrical capacitance caused by the presence or absence of the input tool CMD through the plurality of detection electrodes Rx. For example, the position of the input tool CMD can be outputted by previously setting a threshold value for the change amount of the signal waveform SW and referring to position data of the detection electrode Rx exceeding the threshold value. Alternatively, for example, a value of the signal waveform SW can also be directly compared with the threshold value. A method for monitoring the change amount of the signal waveform SW includes various methods, and, for example, a method for measuring a value of a voltage to be generated in the detection electrode Rx or a method for measuring an integration amount of a current value per unit time flowing through the detection circuit DT1 can be used.

As illustrated in FIG. 5, in a case of a capacitance-type touch panel TP, it is required to provide the driving electrodes Tx and the detection electrodes Rx along the display screen. In the case of the display device including the touch panel TP, positions at which electrodes for the touch panel TP are provided can be roughly classified into those of a display device DIS1 illustrated in FIG. 6, a display device DIS2 illustrated in FIG. 7, and a display device DIS3 illustrated in FIG. 8.

In the display device DIS1 illustrated in FIG. 6, the detection electrode Rx and the driving electrode Tx are provided between the display unit PN1 and the polarizing plate PL1. That is, the display device DIS1 is a display device with an input unit of a so-called ON Cell type having the detection electrode RX and the driving electrode Tx provided on the display surface side of the display unit PN1. The display device with the input unit of the ON Cell type can reduce influence of a structure of the display unit PN1 on a detection accuracy of the touch panel TP.

In the display device DIS2 illustrated in FIG. 7, the detection electrode Rx and the driving electrode Tx are provided inside the display unit PN1, specifically between a substrate FS and a substrate BS. That is, the display device DIS2 is a display device with an input unit of a so-called In Cell type having the detection electrode Rx and the driving electrode Tx provided inside the display unit PN1. In the display device with the input unit of the In Cell type, the electrodes are formed inside the display unit PN1, and therefore, for example, the driving electrode Tx for the touch panel TP can be used also as the common electrode CE for the display unit PN1. If the driving electrode Tx for the touch panel TP is used also as the common electrode CE for the display unit PN1, manufacturing processes can be simplified.

Note that FIGS. 6 and 7 schematically illustrate positions at which the detection electrode Rx and the driving electrode Tx are formed. In a detailed structure of the touch panel TP illustrated in FIGS. 6 and 7, for example, the driving electrode Tx and the plurality of detection electrodes Rx are stacked in the thickness direction through the dielectric layer DL as illustrated in FIG. 4.

Alternatively, as a modification example of FIG. 4, the driving electrode Tx and the detection electrode Rx may be spaced apart from each other in the same layer. In this case, for example, a dielectric layer DL, which covers the driving electrode Tx and the detection electrode Rx is provided between the driving electrode Tx and the detection electrode Rx.

In a display device DIS3 illustrated in FIG. 8, the detection electrode Rx is provided between the display unit PN1 and the polarizing plate PL1. On the other hand, the driving electrode Tx is provided inside the display unit PN1, specifically between the substrate FS and the substrate BS. That is, the display device DIS3 is a display device with an input unit of a mixture of the IN Cell type and the On Cell type having the driving electrode Tx and the detection electrode Rx provided inside the display unit PN1 and on the display surface side of the display unit PN1, respectively. In the case of the display device DIS3, the driving electrode Tx is formed inside the display unit PN1, and therefore, the driving electrode Tx for the touch panel TP can be used also as the common electrode CE for the display unit PN1. The detection electrode Rx is provided closer to the display surface side than the display unit PN1, and therefore, the detection electrode Rx can be brought closer to the input tool CMD (see FIG. 4) such as a finger or others than the case of the In Cell type illustrated in FIG. 7. Therefore, the detection accuracy can be improved.

Note that the display device DIS3 illustrated in FIG. 8 has been described as the display device with the input unit of the mixture type of the In Cell type and the On Cell type, and the display device DIS3 can be considered as one mode of the In Cell type in such a view that the driving electrode Tx is provided inside the display unit PN1. In the display device with the input unit of the In Cell type including the display device DIS3, it has been described that the driving electrode Tx for the touch panel TP can be used also as the common electrode CE for the display unit PN1. However, as a modification example, the driving electrode Tx for the touch panel TP is not used also as but can be independently provided from the common electrode CE for the display unit PN1.

In FIGS. 4 and 5 described above, the driving electrode Tx and the detection electrodes Rx are provided as the example of the touch panel TP which is the capacitance-type input unit, and the method for detecting the position of the input tool CMD by the processing of the detection signal outputted from the detection electrode Rx when the driving signal is inputted to the driving electrode Tx has been described. This method is referred to as a Mutual detection method. In FIG. 4, the touch panel TP of the mutual detection method is illustrated as a touch panel TPm. However, as the detection method of the input unit, not only the mutual detection method but also a Self-detection method may be adopted, the Self-detection method detecting the position of the input tool CMD by the input of the driving signal to each of the plurality of detection electrodes and the process of the signal generated in the plurality of detection electrodes themselves.

Figure 9:
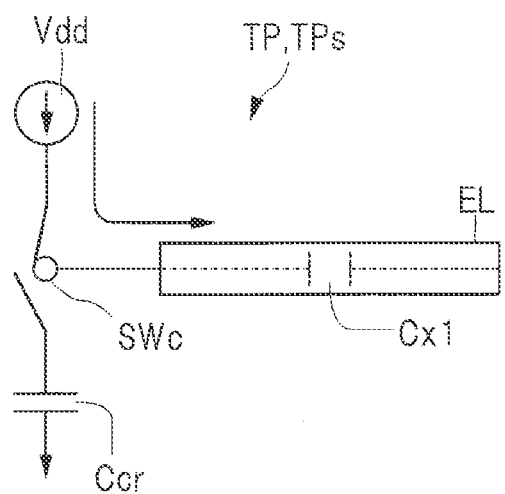
FIG. 9 is an explanatory diagram illustrating a detection principle of a Self-detection method serving as a modification example of a mutual detection method illustrated in FIGS. 4 and 5.
Figure 10:
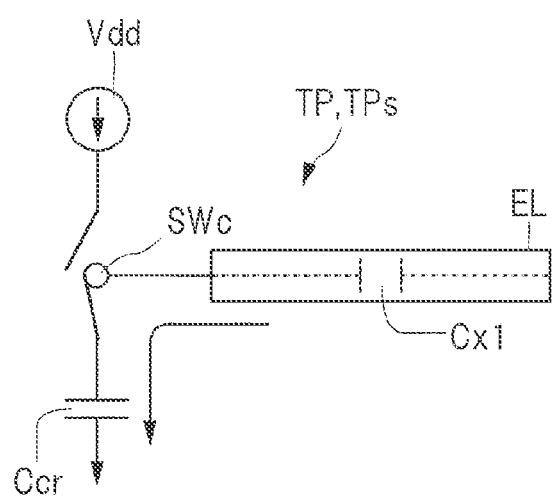
FIG. 10 is an explanatory diagram illustrating the detection principle of the Self-detection method, continued from FIG. 9.
Figure 11:
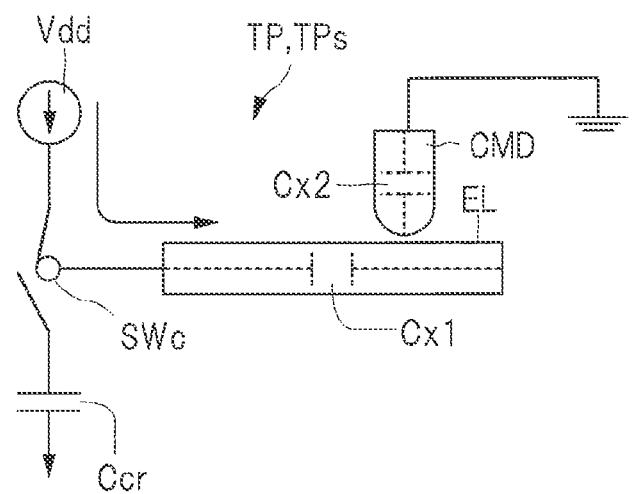
FIG. 11 is an explanatory diagram illustrating the detection principle of the Self-detection method, continued from FIG. 10.
Figure 12:
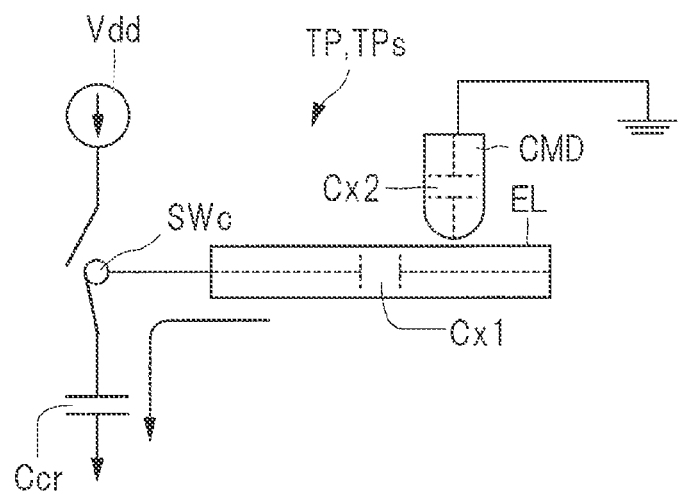
FIG. 12 is an explanatory diagram illustrating the detection principle of the Self-detection method, continued from FIG. 11.

Hereinafter, a detection principle of the Self-detection method will be simply described with reference to the drawings. FIGS. 9 to 12 are explanatory diagrams each illustrating the detection principle of the Self-detection method as a modification example of the mutual detection method illustrated in FIGS. 4 and 5. More specifically, FIGS. 9 and 10 illustrate operations in a state that the input tool CMD (see FIG. 11) does not exist in the vicinity of the detection electrode EL, and FIGS. 11 and 12 illustrate operations in a case that the input tool CMD comes closer to the vicinity of the detection electrode EL.

As illustrated in FIGS. 9 to 12, in a case of a touch panel TPs that operates in the Self-detection method, each of the plurality of detection electrodes EL is connected to a control switch SWc. The control switch SWc has a function of switching a connected state so that either one of a power supply Vdd and a capacitor Ccr is electrically connected to the detection electrodes EL.

In a state illustrated in FIG. 9, the detection electrode EL is connected to the power supply Vdd via the control switch SWc, and is not electrically connected to the capacitor Ccr. In this state, a capacity Cx1 included in the detection electrode EL is charged.

When the control switch SWc is switched from a state illustrated in FIG. 9 to a state illustrated in FIG. 10, the detection electrode EL is connected to the capacitor Ccr via the control switch SWc, and is not electrically connected to the power supply Vdd. In this state, charge in the capacity Cx1 is discharged via the capacitor Ccr.

Next, as illustrated in FIGS. 11 and 12, when the input tool CMD is brought close to the detection electrode, the following operation is performed. That is, in a state illustrated in FIG. 11, the detection electrode EL is connected to the power supply Vdd via the control switch SWc, and is not electrically connected to the capacitor Ccr. At this time, the input tool CMD having a capacity Cx2 exists in the vicinity of the detection electrode EL, and therefore, the capacity Cx1 included in the detection electrode EL and the capacity Cx2 included in the input tool CMD are charged.

When the control switch SWc is switched from the state illustrated in FIG. 11 to a state illustrated in FIG. 12, the detection electrode EL is connected to the capacitor Ccr via the control switch SWc, and is not electrically connected to the power supply Vdd. In this state, charges in the capacity Cx1 and the capacity Cx2 are discharged via the capacitor Ccr.

That is, a voltage change property of the capacitor Ccr changes depending on whether the input tool CMD exists or not in the vicinity of the detection electrode EL. In the Self-detection method, the position of the input tool CMD is detected by providing the plurality of detection electrodes EL connected to the capacitor Ccr and detecting the change in the electrical capacitance caused by the presence or absence of the input tool CMD via the plurality of detection electrodes EL.

In the touch panel TPs of the Self-detection method illustrated in each of FIGS. 9 to 12, each of the plurality of detection electrodes EL serves as both a function of the plurality of detection electrodes Rx and a function of the driving electrode Tx illustrated in FIG. 4. Therefore, if the touch panel TP illustrated in each of FIGS. 6 to 8 is the touch panel TPs of the Self-detection method, it is only required to form the plurality of detection electrodes EL at a position of either one of the detection electrode Rx and the driving electrode Tx illustrated in FIGS. 6 to 8.

Details of Cover Member

Figure 13:
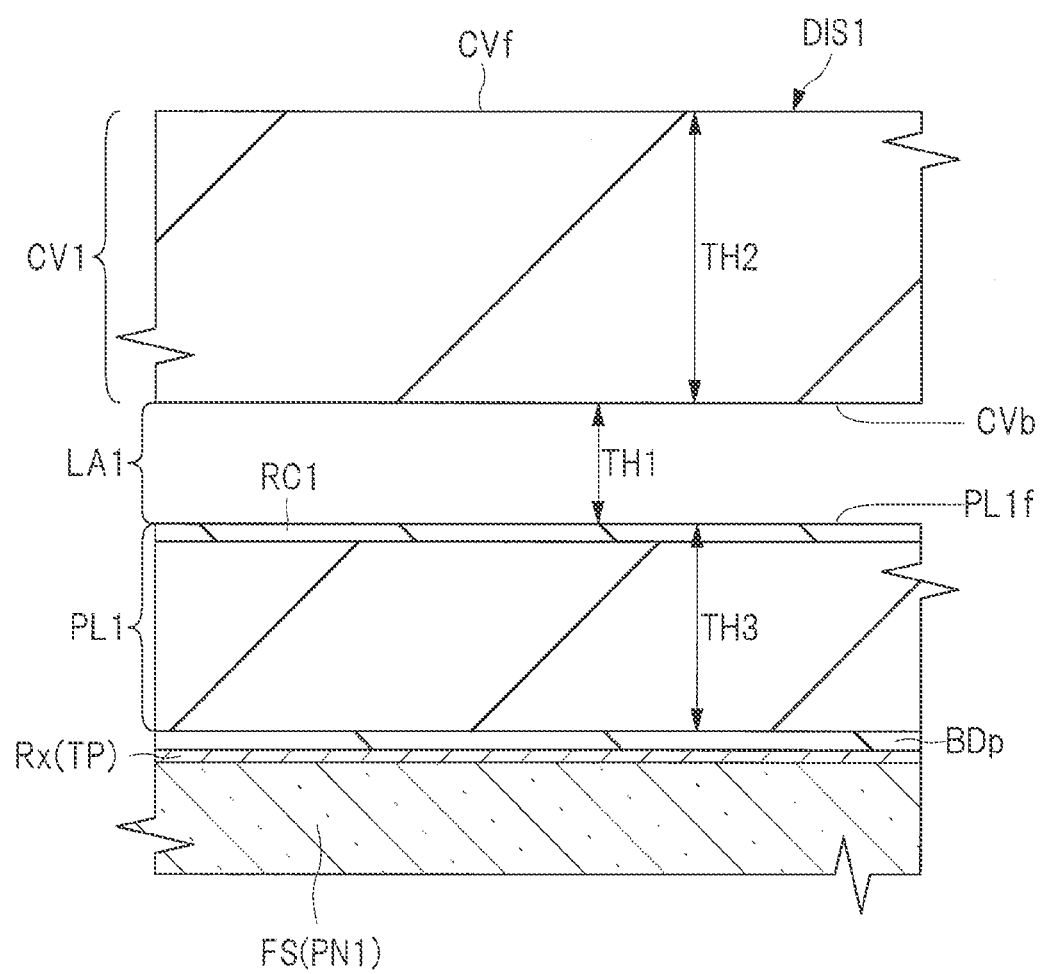
FIG. 13 is an enlarged cross-sectional view illustrating components in periphery of a cover member illustrated in FIG. 2.
Figure 23:
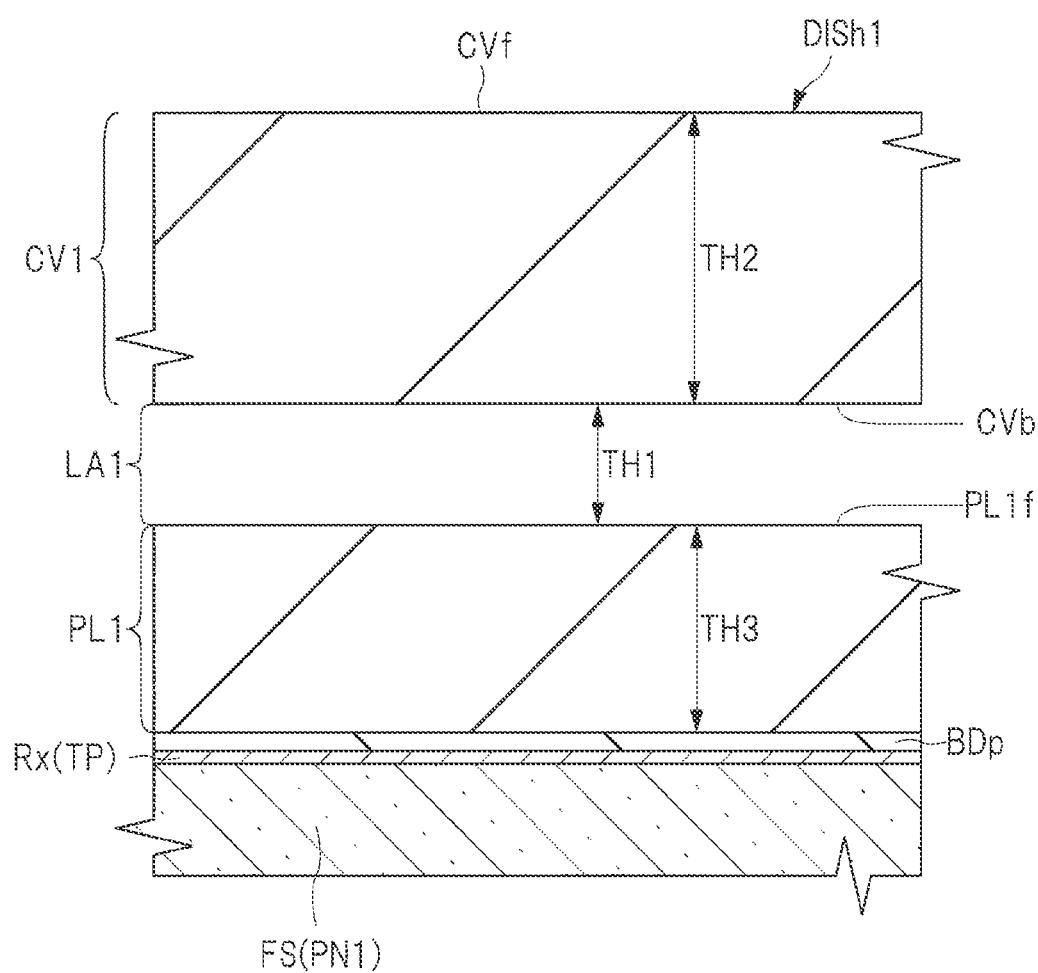
FIG. 23 is an enlarged cross-sectional view illustrating a comparative example of the display device illustrated in FIG. 13.

Next, details of the cover member CV1 illustrated in FIG. 2 will be described. FIG. 13 is an enlarged cross-sectional view illustrating components in periphery of the cover member CV1 illustrated in FIG. 2. FIG. 23 is an enlarged cross-sectional view illustrating a comparison example of the display device illustrated in FIG. 13. Note that FIG. 13 illustrates the cover member CV1 so that the thickness thereof is small in order to illustrate each component in one drawing because the thickness of the cover member CV1 is significantly larger than each thickness of a space LA1 and the polarizing plate PL1.

As illustrated in FIG. 2, the display surface side of the display device DIS1 is covered with the cover member CV1. This cover member CV1 has such a function as a protective member for protecting the polarizing plate PL1, the display unit PN1, and the polarizing plate PL2. Also, by providing the cover member CV1 on the display surface side, local unevenness of the displayed image can be suppressed in some cases.

For the cover member CV1, not only the glass plate but also a resin plate made of a resin material such as acrylic resin is used in some cases. In the present embodiment, the cover member CV1 is a resin plate made of a resin material. If the cover member CV1 is the resin plate, the cover member CV1 can be made lighter in weight than that in the case of the glass plate.

From the viewpoint of suppressing the polarizing plate PL1 from being damaged by contact between the cover member CV1 and the polarizing plate PL1, the cover member CV1 is preferably fixed to the polarizing plate PL1. In the present embodiment, the cover member CV1 is bonded to the polarizing plate PL1 through the bonding material BND applied along a peripheral edge of the polarizing plate PL1. There is a method for applying the bonding material BND to an entire surface on which the cover member CV1 and the polarizing plate PL1 oppose each other. However, from the viewpoint of reducing an application amount of the bonding material BND, a method for applying the bonding material BND along the peripheral edge of the polarizing plate PL1 is preferably used as described in the present embodiment.

In this case, inside a bonding region to which the bonding material BND has been applied, a space LA1 serving as a hollow space is interposed between a back surface CVb of the cover member CV1 and a front surface PL1$f$ of the polarizing plate PL1. The space LA1 spreads along the back surface CVb of the cover member CV1 and the front surface PL1$f$ of the polarizing plate PL1, and, for example, air exists inside the space LA1. In other words, the back surface CVb of the cover member CV1 and the front surface PL1$f$ of the polarizing plate PL1 oppose each other through the space LA1 spreading along the back surface Cvb of the cover member CV1.

In a method for oppositely arranging the cover member CV1 and the polarizing plate PL1 through the space LA1 as described above, the application amount of the bonding material BND can be reduced. If the application amount of the bonding material BND can be reduced, an error of the application amount of the bonding material BND can be reduced when the display device DIS1 is assembled. Therefore, leakage of the bonding material BND caused by variation in the application amount of the bonding material BND can be reduced. Alternatively, by reducing the error of the application amount of the bonding material BND, a separation distance between the back surface CVb of the cover member CV1 and the front surface PL1$f$ of the polarizing plate PL1, i.e., the thickness TH1 of the space LA1 illustrated in FIG. 13 can be stabilized.

Figure 14:
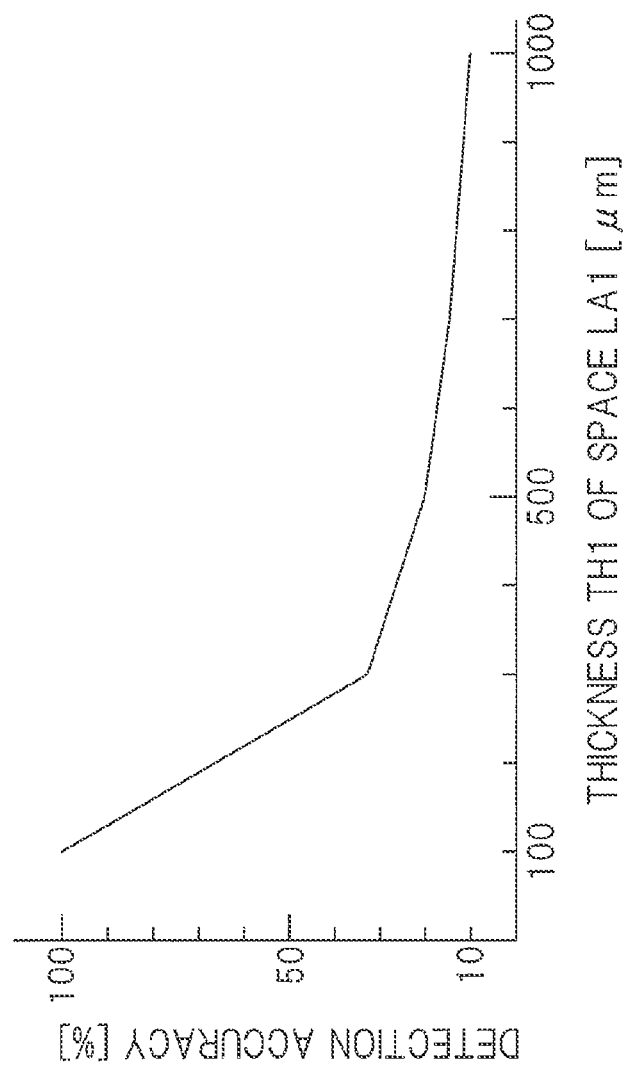
FIG. 14 is an explanatory diagram illustrating a relation between a detection accuracy of the touch panel and a thickness of a space illustrated in FIG. 13.

However, the thickness of the space LA1 is preferably reduced. That is, from the viewpoint of thinning the display device DIS1, the thickness of each component in the display device DIS1 is preferably reduced, and the thickness TH1 of the space LA1 is also preferably reduced. FIG. 14 is an explanatory diagram illustrating a relation between the detection accuracy of a touch panel and the thickness of the space illustrated in FIG. 13. A vertical axis illustrated in FIG. 14 indicates the detection accuracy of the touch panel, and shows a ratio obtained when the detection accuracy in the thickness TH1 of the space LA1 of 100 μm is set to 100%. Also, a horizontal axis illustrated in FIG. 14 indicates a value of, for example, the thickness TH1 of the space LA1 illustrated in FIG. 13 in the touch panel.

In the case of the display device with the input unit in which the space LA1 is interposed between the detection electrode Rx and the cover member CV1 as described in the display device DIS1 according to the present embodiment illustrated in FIG. 13, the space LA1 is interposed between the detection electrode Rx and the input tool CMD such as a finger (see FIG. 4). Therefore, by reducing the thickness TH1 of the space LA1, the positional detection accuracy by the detection electrode Rx can be improved.

For example, in the example illustrated in FIG. 13, the thickness TH2 of the cover member CV1 is about 1 mm to 2 mm. However, the thickness TH1 of the space LA1 is preferably smaller than the thickness TH2 of the cover member CV1. From the viewpoint of improving the detection accuracy of the touch panel TP, the thickness TH1 of the space LA1 is preferably 300 μm or smaller. When the inventors of the present application have studied a relation between the detection accuracy of the touch panel TP and the thickness TH1 of the space LA1, the detection accuracy of the touch panel TP and the thickness TH1 of the space LA1 are schematically in an inverse proportional relation as illustrated in FIG. 14. That is, the smaller the thickness TH1 of the space LA1 is, the larger the detection accuracy of the touch panel TP is improved. Particularly, if the thickness TH1 of the space LA1 is 300 μm or smaller, an effect of improving the detection accuracy of the touch panel TP is increased by decreasing the thickness TH1 of the space LA1. Therefore, the thickness TH1 of the space LA1 is preferably set to equal to or smaller than the thickness TH3 of the polarizing plate PL1. In the example illustrated in FIG. 13, the thickness TH3 of the polarizing plate PL1 is about 100 μm. Therefore, if the thickness TH1 of the space LA1 is 100 μm or smaller, the thickness TH1 of the space LA1 is about the same as the thickness TH3 of the polarizing plate PL1, or equal to or smaller than the thickness TH3 thereof.

Regarding Newton's Rings

Here, by the further study by the inventors of the present application, it is found out that, in the display device in which the cover member CV1 and the polarizing plate PL1 are oppositely arranged through the space LA1, periphery of an elastically-deformed portion is not correctly displayed in some cases when the cover member CV1 is locally elastically deformed. For example, in the case of the display device DISh1 with the touch panel TP as described in the display device DIS1 according to the present embodiment illustrated in FIG. 13 and the display device DISh1 illustrated in FIG. 23, when the input operation is performed with a finger or others, the cover member CV1 is locally elastically deformed in some cases. The display device DISh1 illustrated in FIG. 23 is different from the display device DIS1 illustrated in FIG. 13 in that the reflection suppressing layer RC1 (which is one example of the first reflection suppressing layer) illustrated in FIG. 13 is not formed on each of the front surface CVf and the back surface CVb of the cover member CV1 and the front surface PL1f of the polarizing plate PL1. In other points, it is similar to the display device DIS1 illustrated in FIG. 13.

As a result of the study on the display device DISh1 illustrated in FIG. 23 by the inventors of the present application, it is found out that by the local deformation of a part of the cover member CV1 in the display device DISh1 by the touching operation, annular interference patterns called Newton's rings are visually recognized in periphery of the deformed portion.

The Newton's rings are a large number of concentric interference patterns caused by interference of a light wave reflected on both the back surface CVb of the cover member CV1 and the front surface PL1f of the polarizing plate PL1 when a part of the cover member CV1 is locally deformed. Therefore, the Newton's rings are not caused if the cover member CV1 is not deformed, and disappear if the elastically-deformed portion of the cover member CV1 is restored. However, from the viewpoint of improving the image quality of the display device, it is preferred that the Newton's rings are not visually recognized even when the cover member CV1 is elastically deformed.

The larger the radius of curvature of a curved portion of the cover member CV1 is, the larger the diameter of the Newton's rings is, and the Newton's rings are easy to be visually recognized. Also, when the cover member CV1 and the polarizing plate PL1 contact each other, the Newton's rings are particularly easy to be visually recognized.

That is, as described above, if the cover member CV1 is the resin plate made of the resin material such as acrylic resin, the cover member CV1 is easy to deform. Therefore, the Newton's rings are easy to be visually recognized. In the case of the display device DIS1 with the touch panel TP as described in the present embodiment, the cover member CV1 is locally pressed with a finger or others, and therefore, the cover member CV1 is easy to locally deform.

If the thickness TH1 of the space LA1 is small as described above, the radius of curvature of the curved portion of the cover member CV1 becomes large, and therefore, the Newton's rings is easy to be visually recognized. Also, when a part of the cover member CV1 and a part of the polarizing plate PL1 contact each other, the Newton's rings are particularly easy to be visually recognized because the thickness TH1 of the space LA1 is small.

Accordingly, the inventors of the present application have studied a technique for suppressing the appearance of the Newton's rings. As a result, as described in detail below, it is found out that the appearance of the Newton's rings can be suppressed if the reflection suppressing layer RC1 (see FIG. 13) is formed on at least either one of two surfaces opposing the space LA1. Hereinafter, the technique will be described in detail with reference to a result of an experiment performed on various configurations by the inventors of the present application.

Figure 16:
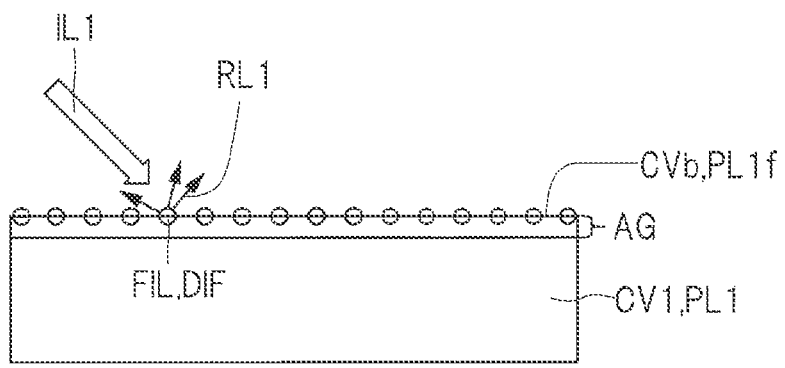
FIG. 16 is an explanatory diagram schematically illustrating one structure example of a reflection suppressing layer.
Figure 17:
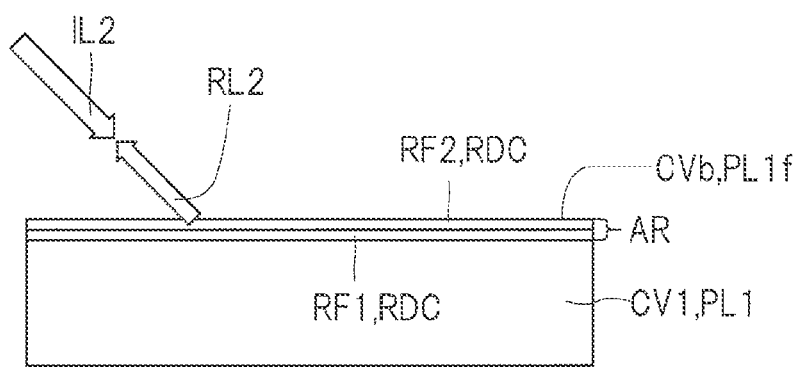
FIG. 17 is an explanatory diagram schematically illustrating a structure example for suppressing reflection in a method different from that illustrated in FIG. 16.

FIG. 15 is an explanatory diagram illustrating a relation between a method for a reflection suppressing process on each of surfaces of the cover member and the polarizing plate and the degree of the appearance of the Newton's rings. FIG. 16 is an explanatory diagram schematically illustrating an example of one structure of the reflection suppressing layer. FIG. 17 is an explanatory diagram schematically illustrating an example of a structure for suppressing reflection by a method different from that illustrated in FIG. 16. FIGS. 18 to 21 are enlarged cross-sectional views each illustrating a display device as a modification example of FIG. 13.

In FIG. 15, the uppermost stage of each table shows a plot number. In a column for the plot number, a condition of a comparison plot CP corresponding to the display device DISh1 illustrated in FIG. 23 is described. Each of symbols EP1, EP2, EP3, . . . , EP16 in the columns for the plot number indicates a number of an experimental plot.

A correspondence between the display devices illustrated in FIGS. 13, 18 to 21, and 23 and each experimental plot illustrated in FIG. 15 is as follows. That is, the display device DISh1 illustrated in FIG. 23 corresponds to the comparison plot CP illustrated in FIG. 15. The display device DIS1 illustrated in FIG. 13 corresponds to the experimental plot EP2, the experimental plot EP3, and the experimental plot EP4 illustrated in FIG. 15. A display device DIS4 illustrated in FIG. 18 corresponds to the experimental plot EP1 illustrated in FIG. 15. A display device DIS5 illustrated in FIG. 19 corresponds to the experimental plot EP5, the experimental plot EP12, the experimental plot EP13, and the experimental plot EP14 illustrated in FIG. 15. A display device DIS6 illustrated in FIG. 20 corresponds to the experimental plot EP7, the experimental plot EP8, the experimental plot EP9, the experimental plot EP10, the experimental plot EP15, and the experimental plot EP16 illustrated in FIG. 15. A display device DIS1 illustrated in FIG. 21 corresponds to the experimental plot EP6 and the experimental plot EP11 illustrated in FIG. 15.

A lower stage of the column for the plot number shows a type of surface treatment for each surface of the front surface CVf and the back surface CVb of the cover member CV1 (see FIG. 13) and the front surface PL1f of the polarizing plate PL1 (see FIG. 13). More specifically, the column for the surface treatment shows a type of a functional film having a function of suppressing reflected light such as the reflection suppressing layer RC1 illustrated in FIG. 13, and shows distinction of the degree of suppression of the reflected light.

The reflection suppressing layer RC1 illustrated in FIG. 13 is an optical functional film having a function of reducing the reflected light visually recognized on the display surface side by controlling a reflection direction of the reflected light reflected on the display surface side. A method for reducing the visually-recognized reflected light is roughly classified into a light diffusion method illustrated in FIG. 16 and a light interference attenuation method illustrated in FIG. 17.

A reflection suppressing layer AG in the light diffusion method illustrated in FIG. 16 includes a light diffusion portion DIF for diffusing incident light IL1 in a plurality of directions. The light diffusion portion DIF is a portion having a function of diffusing reflected light RL1 into a plurality of directions. In an example illustrated in FIG. 16, a large number of particles FIL each having a particle diameter of, for example, about 2 μm to 4 μm are dispersedly arranged in resin. The incident light IL1 irradiated onto the reflection suppressing layer AG is diffused by the light diffusion portion DIF, and therefore, an amount of the reflected light RL1 that reaches the observer is attenuated. As a result, the luminance of the reflected light RL1 that can be visually recognized is reduced. Note that a configuration of the reflection suppressing layer AG in the light diffusion method includes not only the example illustrated in FIG. 16 but also various modification examples. For example, a method for a roughening treatment of an exposed surface of the reflection suppressing layer AG by using a sandblasting method or others is cited.

A structure obtained by the roughening treatment of the exposed surface of the reflection suppressing layer AG can be described as follows. That is, the surface roughness of the exposed surface of the reflection suppressing layer AG is larger than that of a bonding interface with a base member (the cover member CV1 or the polarizing plate PL1 in the example illustrated in FIG. 16) positioned on the opposite side of the exposed surface. Also, the structure obtained by performing a surface-roughening treatment to the reflection suppressing layer RC1 illustrated in FIG. 13 and FIG. 18 described later can be interpreted as follows. That is, a surface of the reflection suppressing layer RC1 opposing to the cover member CV1 has a higher surface roughness than a surface of the reflection suppressing layer RC1 opposing to the polarizing plate PL1. Further, the structure obtained by performing a surface treatment to the reflection suppressing layer RC2 illustrated in FIG. 18 can be interpreted as follows. That is, a surface of the reflection suppressing layer RC2 opposing to the polarizing plate PL1 has a higher surface roughness than a surface of the reflection suppressing layer RC2 opposing to the cover member CV1.

The degree of the reflection suppression effect of the reflection suppressing layer AG in the light diffusion method can be evaluated by using an indication of a haze. The haze is obtained as a ratio of a diffusion transmitted light beam with respect to all transmitted light beams. The higher the haze is, the larger the reflection suppression effect is.

In the experimental plot in which "AG1" is described in the column for the surface treatment illustrated in FIG. 15, the reflection suppressing layer AG is formed so that the haze is 26%. Also, in the experimental plot in which "AG2" is described in the column for the surface treatment illustrated in FIG. 15, the reflection suppressing layer AG is formed so that the haze is 28%.

Note that an experiment result illustrated in FIG. 15 shows the case of the haze of 26% and the case of the haze of 28%. However, as described later, an effect of suppressing the Newton's rings by a reflection suppressing layer AG illustrated in FIG. 16 is higher than an effect of suppressing the Newton's rings by a reflection suppressing layer AR illustrated in FIG. 17. Therefore, even if a value of the haze is lower than 26%, it is considered that the effect of suppressing the Newton's rings can be obtained as compared with that in the comparison plot CP illustrated in FIG. 15.

On the other hand, in the reflection suppressing layer AR in the light interference attenuation method illustrated in FIG. 17 has a reflection-direction adjustment portion RDC that uniforms reflection angles of reflected light RL2 with respect to incident light IL2. The reflection-direction adjustment portion RDC is a portion including a plurality of sections which are different from each other in refractive index and having a function of causing the reflection angles of the reflected light RL2 with respect to the incident light IL2 to uniform by using refraction of light. An example illustrated in FIG. 17 describes that the reflection angles of the reflected light RL2 with respect to the incident light IL2 are uniformed by stacking a reflective film RF1 and a reflective film RF2 which are different from each other in the refractive index. As illustrated in FIG. 17, for example, if an incident angle of the incident light IL2 on the front surface PL1f of the polarizing plate PL1 and a reflection angle of the reflected light RL2 match each other, the reflected light RL2 which reaches the observer can be attenuated by interference between the incident light IL2 and the reflected light RL2. As a result, the luminance of the reflected light RL2 which can be visually recognized is reduced. Note that a configuration of the reflection suppressing layer AR in the light interference attenuation method includes not only the example illustrated in FIG. 17 but also various modification examples. For example, three or more reflective films may be stacked. Alternatively, a plurality of structures such as prisms may be dispersedly arranged in the reflection suppressing layer AR.

The degree of the reflection suppression effect by the reflection suppressing layer AR in the light interference attenuation method can be evaluated by using an indication of a reflectivity. The reflectivity is obtained as a ratio of reflected light with respect to incident light. The smaller the reflectivity is, the larger the reflection suppression effect is.

In the experimental plot in which "AR1" is described in the column for the surface treatment illustrated in FIG. 15, the reflection suppressing layer AR is formed so that the reflectivity is 1.6%. Also, in the experimental plot in which "AR2" is described in the column for the surface treatment illustrated in FIG. 15, the reflection suppressing layer AR is formed so that the reflectivity is 0.3%. Also, in the experimental plot in which "AR3" is described in the column for the surface treatment illustrated in FIG. 15, the reflection suppressing layer AR is formed so that the reflectivity is 0.14%.

Also, in the experimental plot in which "HC" is described in the column for the surface treatment illustrated in FIG. 15, neither the reflection suppressing layer AG illustrated in FIG. 16 nor the reflection suppressing layer AR illustrated in FIG. 17 is formed.

The lower stage of the column for the surface treatment shows the thickness TH2 of the cover member CV1 (see FIG. 13) and the thickness TH1 of the space LA1 (see FIG. 13). For an experiment in which the thickness TH2 of the cover member CV1 and the thickness TH1 of the space LA1 are changed, experiment results of some of the plurality of experimental plots are shown.

The lower stage of the column for the thickness shows the degree of the Newton's rings. An evaluation result of the degree of the Newton's rings is a result obtained by visually checking whether the Newton's rings appear or not. The experimental plot in which a mark "double circle" is shown particularly has the higher effect of suppressing the Newton's rings than those in other experimental plots. The "double circle" is shown in the experimental plot in which the Newton's rings are hardly visually recognized even when the cover member CV1 (see FIG. 13) is locally deformed by intentionally pressing the member with a strong force of, for example, about 20 N (Newton).

The experimental plot in which a mark "circle (double circle)" is shown has the effect of suppressing the Newton's rings which is the second highest effect of that in the experimental plot in which "double circle" is shown. Although the Newton's rings are caused in some cases if the cover member CV1 (see FIG. 13) is intentionally pressed with a strong force, "circle (double circle)" is shown in the experimental plot in which the frequency of occurrence of the Newton's rings is particularly lower than in the experimental plot in which "circle" is shown as described later.

The experimental plot in which "circle" is shown has the effect of suppressing the Newton's rings which is the second highest effect from that in the experimental plot in which "circle (double circle)" is shown. Although the Newton's rings occur if the cover member CV1 (see FIG. 13) is intentionally pressed with a strong force, the "circle" is shown in the experimental plot in which the Newton's rings do not occur with a force of, for example, only about 3N (Newton) which is assumed in a normal touching operation.

The experimental plot in which a mark "triangle (circle)" is shown has the effect of suppressing the Newton's rings which is the second highest effect of that in the experimental plot in which "circle" is shown. The "triangle (circle)" is shown in the experimental plot having the higher visual-recognizable frequency of the Newton's rings than that in the experimental plot in which "circle" is shown, but the lower frequency of occurrence of the Newton's rings than in the experimental plot in which "triangle" is shown.

The experimental plot in which a mark "circle" is shown has the effect of suppressing the Newton's rings which is the second highest of that in the experimental plot in which "triangle (circle)" is shown. "triangle" is shown in the experimental plot in which the Newton's rings is visually recognized by a touching operation of a normally-assumed degree in some cases but in which the frequency of occurrence of the Newton's rings is clearly lower than that in the comparison plot CP.

A mark "cross" is shown in only the comparison plot CP in the table illustrated in FIG. 15. In the comparison plot CP, the Newton's rings have been visually recognized at a higher frequency than that in the experimental plot in which the mark "triangle" is shown.

A technique for suppressing the appearance of the Newton's rings will be described with reference to an evaluation result illustrated in FIG. 15 based on the above-described evaluation criteria.

First, the comparison plot CP and the experimental plots EP1 to EP4 illustrated in FIG. 15 are compared with each other. It is found out that the occurrence of the Newton's rings can be suppressed in the experimental plots more than in the comparison plot CP by providing the reflection suppressing layer RC1 or the reflection suppressing layer RC2 (which is one example of the second reflection suppressing layer) on at least either one of the back surface CVb of the cover member CV1 and the front surface PL1f of the polarizing plate PL1 as described in the display device DIS1 illustrated in FIG. 13 or the display device DIS4 illustrated in FIG. 18.

Also, it is found out that the occurrence of the Newton's rings can be suppressed regardless of the presence or absence of the surface treatment on the front surface CV1 of the cover member CV1 since higher than an evaluation represented by the evaluation with the mark "triangle" or more excellent mark are shown in all the experimental plots EP1 to EP16.

In comparison between the experimental plot EP1 and the experimental plot EP2, it is found out that the occurrence of the Newton's rings is easier to be suppressed when the reflection suppressing layer RC1 is provided on the front surface PL1f of the polarizing plate PL1 as described in the display device DIS1 illustrated in FIG. 13. In other words, the Newton's rings are difficult to occur in the display device DIS1 illustrated in FIG. 13 relatively more than the display device DIS4 illustrated in FIG. 18.

Next, effects of reducing the visually-recognized reflected light by a function of the reflective liquid crystal layer RC1 (see FIG. 13), the reflective liquid crystal layer RC2 (see FIG. 18), or others will be compared. In the comparison between the experimental plot EP2 and the experimental plot EP3, it is found out that the effect of suppressing the Newton's rings is higher in the method for diffusing the incident light by the light diffusion portion DIF as the reflection suppressing layer AG illustrated in FIG. 16 than the reflection suppressing layer AR illustrated in FIG. 17. This tendency is similar in a case of comparison of the experimental plot 7, 8, or 12 with the experimental plot EP5. As shown in the experimental plots EP15 and EP16, the effect of suppressing the Newton's rings by the reflection suppressing layer AR is difficult to be improved even if the thickness TH2 of a cover member CV1 illustrated in FIG. 20 is reduced.

Figure 18:
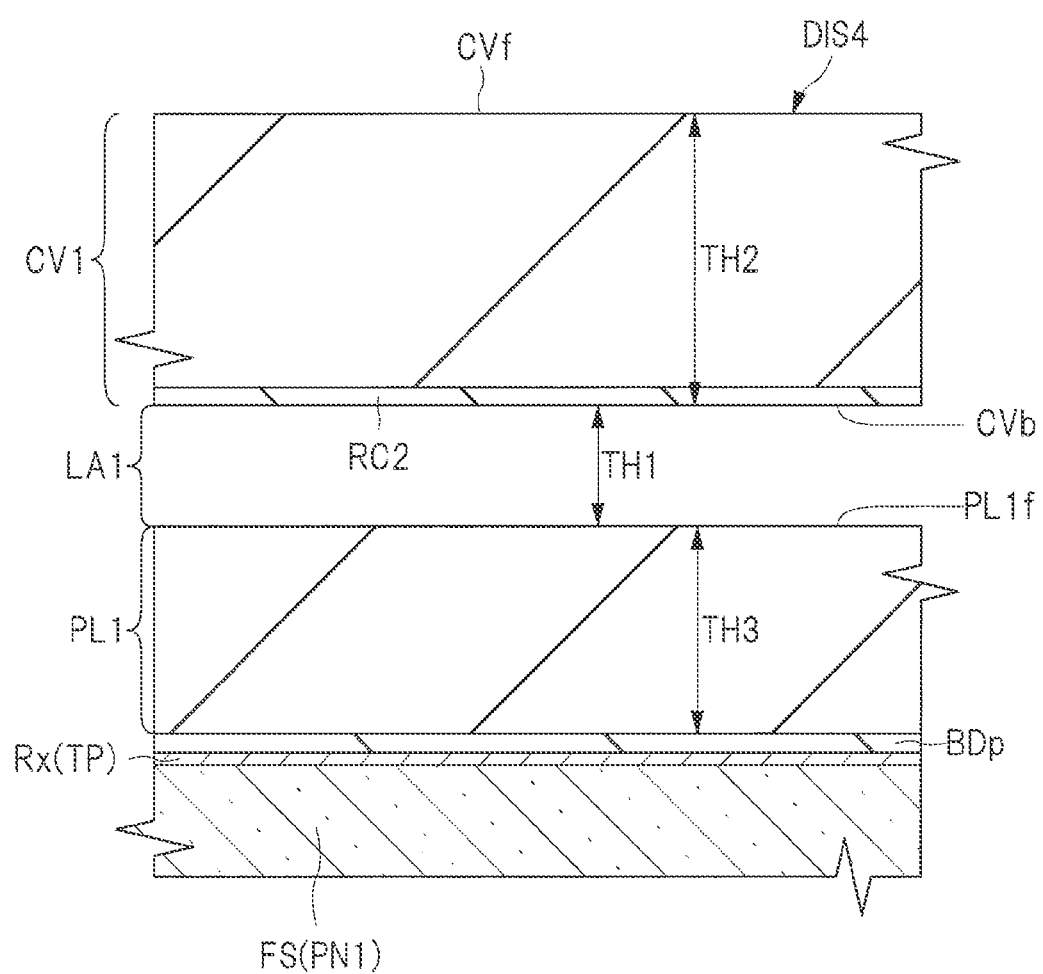
FIG. 18 is an enlarged cross-sectional view illustrating a display device serving as a modification example of FIG. 13.
Figure 19:
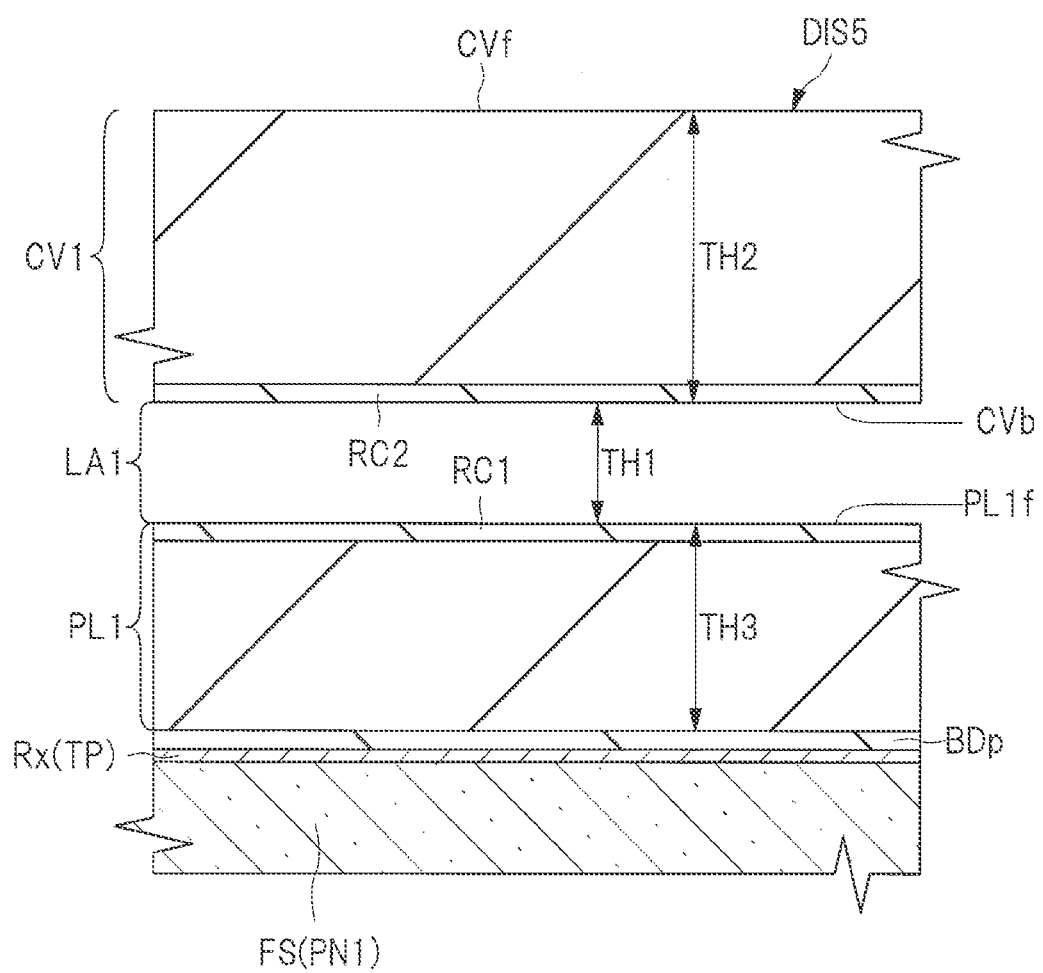
FIG. 19 is an enlarged cross-sectional view illustrating a display device serving as another modification example of FIG. 13.
Figure 20:
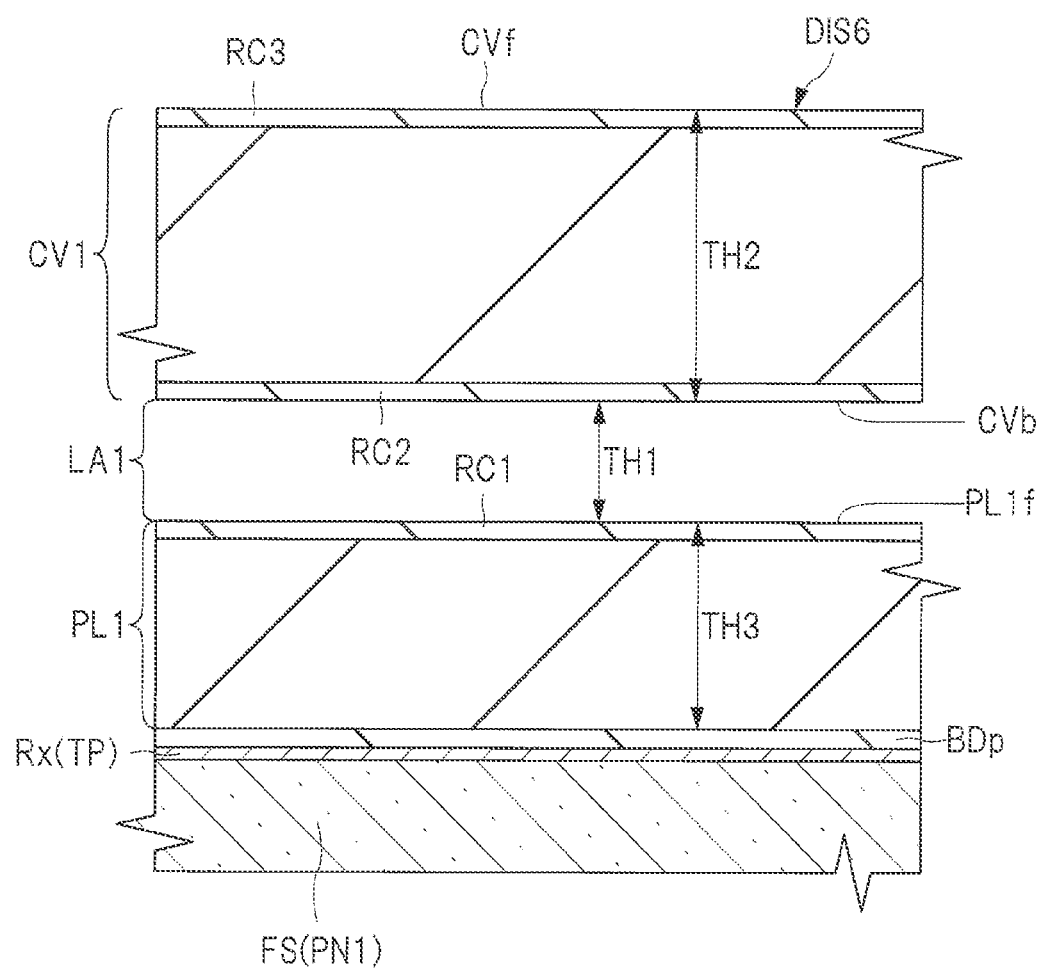
FIG. 20 is an enlarged cross-sectional view illustrating a display device serving as another modification example of FIG. 13.

Therefore, from the viewpoint of suppressing the occurrence of the Newton's rings, the reflection suppressing layer RC1 illustrated in FIGS. 13, 19, and 20 is preferably the reflection suppressing layer AG illustrated in FIG. 16. The reflection liquid crystal layer RC2 illustrated in FIGS. 18, 19, and 20 is preferably the reflection suppressing layer AG illustrated in FIG. 16. Particularly, if a reflection suppressing layer is formed on either one of the back surface CVb of the cover member CV1 and the front surface PL1f of the polarizing plate PL1 but a reflection suppressing layer is not formed on the other as described in the display device DIS1 illustrated in FIG. 13 and the display device DIS4 illustrated in FIG. 18, the reflection suppressing layer AG illustrated in FIG. 16 is preferably formed.

Figure 21:
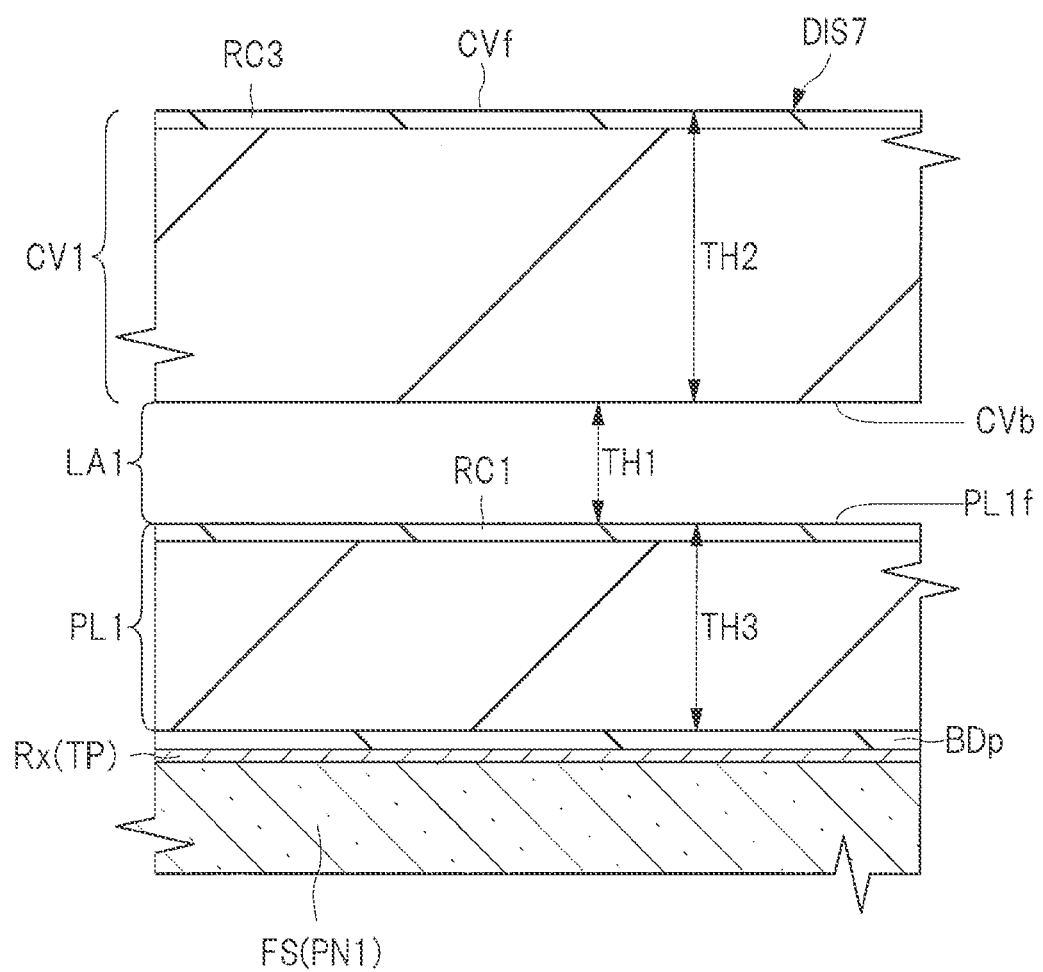
FIG. 21 is an enlarged cross-sectional view illustrating a display device serving as another modification example of FIG. 13.

If a reflection suppressing layer RC3 is formed on a front surface CVf of the cover member CV1 as described in the display device DIS6 illustrated in FIG. 20 and the display device DIS1 illustrated in FIG. 21, the effect of suppressing the occurrence of the Newton's rings is higher when the reflection suppressing layer RC3 is the reflection suppressing layer AG illustrated in FIG. 16. However, when the experimental plots EP2, EP5, and EP6 are compared with one another, the effect of suppressing the occurrence of the Newton's rings by the reflection suppressing layer RC3 formed on the front surface CVf of the cover member CV1 is considered to be relatively smaller than the reflection suppressing layer RC2 on the back surface Cvb of the cover member CV1 (see FIG. 19).

In comparison between each of the experimental plots EP1 and EP2 and the experimental plot EP5, the mark "double circle" is shown in the evaluation in the column for the Newton's rings in the experimental plot EP5 because the reflection suppressing layer AG (see FIG. 16) is formed on the back surface CVb and the front surface PL1f although any reflection suppressing layer is not formed on the front surface CVf. Therefore, if the reflection suppressing layer RC1 is provided on the front surface PL1f of the polarizing plate PL1 and the reflection suppressing layer RC2 is provided on the back surface CVb of the cover member CV1 as described in the display device DIS5 illustrated in FIG. 19, the occurrence of the Newton's rings is easier to be suppressed than the display device DIS1 illustrated in FIG. 13 and the display device DIS4 illustrated in FIG. 18. If each of the reflection suppressing layer RC1 and the reflection suppressing layer RC2 is the reflection suppressing layer AG illustrated in FIG. 16, the effect of suppressing the Newton's rings is particularly high. If each of the reflection suppressing layer RC1 and the reflection suppressing layer RC2 illustrated in FIG. 19 can be formed, the reflection suppressing layer RC1 and the reflection suppressing layer RC2 are preferably provided in preference to the reflection suppressing layer RC3 illustrated in FIGS. 20 and 21.

However, as seen from the comparison between the experimental plot EP2 and the experimental plot EP4, if the haze value of the reflection suppressing layer AG (see FIG. 16) is large, the Newton's rings are difficult to be visually recognized. According to comparison result between the comparison plot CP and the experimental plot EP4, the haze value of the reflection suppressing layer AG is preferably 26% or larger. According to comparison result between the experimental plots EP2 and EP4, if the reflection suppressing layer RC2 (see FIG. 19) is not provided on the back surface CVb of the cover member CV1 as illustrated in FIG. 13, the haze value of the reflection suppressing layer AG is particularly preferably 28% or larger.

In comparison among the experimental plots EP7, EP8, and EP9, it is found out that, even if each of the reflection suppressing layer RC1, the reflection suppressing layer RC2, and the reflection suppressing layer RC3 illustrated in FIG. 20 is the reflection suppressing layer AR illustrated in FIG. 17, the occurrence of the Newton's rings can be suppressed by reducing a reflectivity based on the reflection suppressing layer AR. That is, if the reflectivity of the reflection suppressing layer AR illustrated in FIG. 17 is 1.6% or lower, the effect of suppressing the occurrence of the Newton's rings can be obtained. The reflectivity of the reflection suppressing layer AR is preferably 0.3% or lower, more particularly, 0.14% or lower.

Note that there is no experimental plot in which each of the reflection suppressing layer RC1 and the reflection suppressing layer RC2 illustrated in FIG. 19 is the reflection suppressing layer AR illustrated in FIG. 17. However, as described above, the effect of suppressing the Newton's rings by providing the reflection suppressing layer RC3 (see FIG. 20) on the front surface CVf of the cover member CV1 is relatively small. Therefore, it is considered that similar results to that in the comparison among the experimental plots EP7, EP8, and EP9 can be also obtained for the reflection suppressing layer RC1 and the reflection suppressing layer RC2 illustrated in FIG. 19.

If each of the reflection suppressing layer RC1 and the reflection suppressing layer RC2 illustrated in FIG. 19 is the reflection suppressing layer AG illustrated in FIG. 16 as described in the experimental plot EP5, the Newton's rings are hardly visually recognized. As described in the experimental plots EP13 and EP14, this evaluation result is similar even if the thickness TH1 of the space LA1 (see FIG. 19) changes. In this case, even if the reflection suppressing layer RC3 (see FIG. 20) is not provided on the front surface CVf of the cover member CV1 as illustrated in FIG. 19, the effect of suppressing the Newton's rings does not change. On the other hand, from the viewpoint of achieving high efficiency of processes for manufacturing the display device, the reflection suppressing layer RC3 is preferably not formed.

In the foregoing, the invention made by the inventors of the present application has been concretely described based on the embodiments and the typical modification examples. However, there are various modification examples in addition to the above-described modification examples. For example, while the display device using the liquid crystal layer as a display functional layer is disclosed in the above-described embodiment, another method may be used. For example, the above-described technique is also applicable to a display device of a so-called organic EL type using a light emitting element made of an organic compound as the display functional layer.

Also, in the above-described embodiment, the display device with the input unit having such a high probability that the Newton's rings are visually recognized is disclosed. However, the present invention may be applicable to a display device without the input unit. Even in the display device without the input unit, if there is a factor of the local deformation of a part of the cover member that covers the display surface side of the display unit through the space, the Newton's rings are visually recognized in some cases. In this case, the visual recognition of the Newton's rings can be suppressed by applying the above-described technique.

For example, in the above-described embodiment, the aspect in which the cover member is the resin plate made of the resin material has been exemplified and described. The resin-made cover member is easier to locally deform than a glass-made cover member when an external force is locally applied thereto, and therefore, is easier to establish a condition under which the Newton's rings are visually recognized. However, even if the cover member is made of glass, the Newton's rings are visually recognized in some cases depending on the thickness of the space or the thickness of the cover member. In this case, by applying the above-described technique, the visual recognition of the Newton's rings can be suppressed.

For example, in the above-described embodiment, the aspect in which the first member arranged so as to oppose the cover member through the space is the polarizing plate is disclosed. However, even if the member arranged to oppose the cover member through the space is not the polarizing plate, the Newton's rings are also visually recognized in some cases. In this case, by applying the above-described technique, the visual recognition of the Newton's rings can be suppressed.

Figure 22:
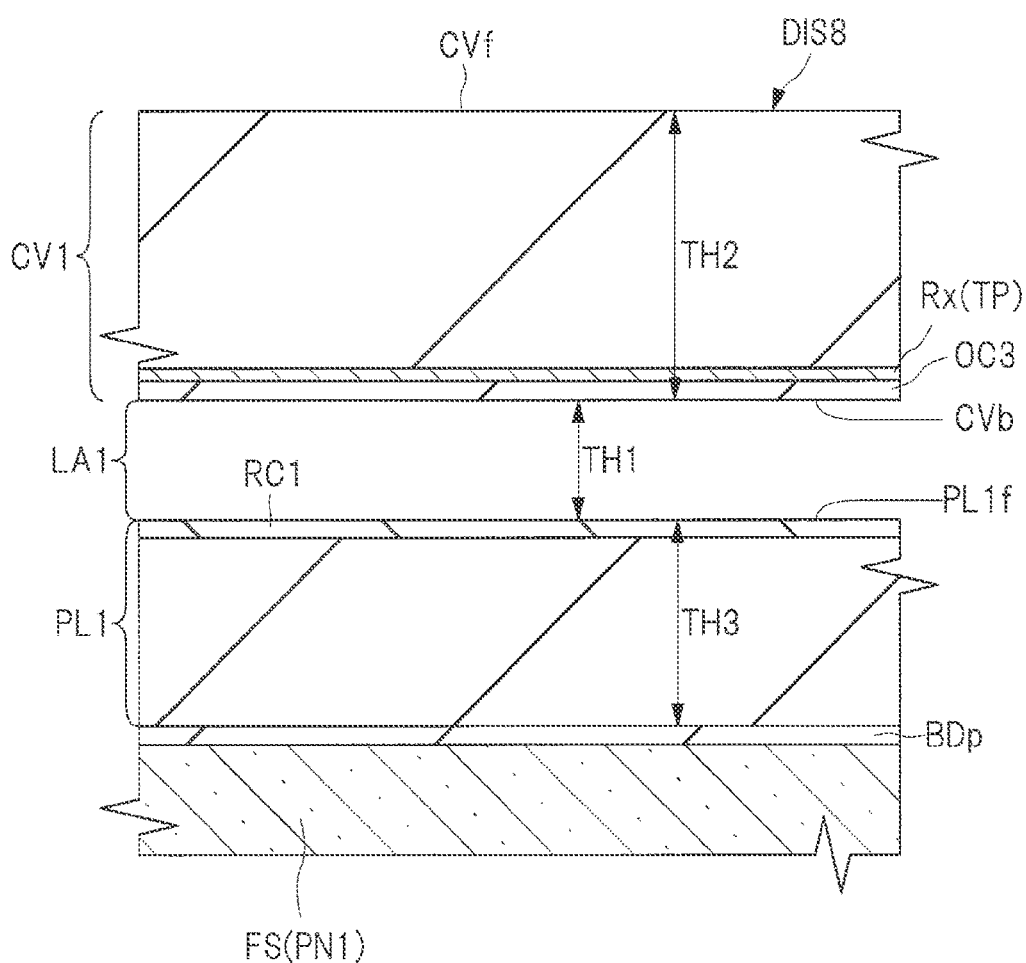
FIG. 22 is an enlarged cross-sectional view illustrating a display device serving as another modification example of FIG. 13.

For example, in the above-described embodiment, the aspect in which the space LA1 is provided between the detection electrode Rx and the cover member CV1 is discussed as illustrated in FIGS. 13, 18, 19, 20, and 21. However, as described in the display device DIS8 illustrated in FIG. 22, the detection electrode Rx may be formed between the front surface CVf and the back surface CVb of the cover member CV1. FIG. 22 is an enlarged cross-sectional view illustrating a display device serving as another modification example of FIG. 13.

The display device DIS8 illustrated in FIG. 22 is different from the display device DIS1 illustrated in FIG. 13 in that the detection electrode Rx is formed on the back surface CVb side of a cover member CV1, i.e., on the opposite side of the front surface CVf thereof serving as the display surface. This is the same as the display device DIS1 in other points.

In the case of the display device DIS8, the detection electrode Rx is covered with a coating film such as a resin layer OC3, and one surface of the resin layer OC3 has the back surface CVb of the cover member CV1. In other words, the detection electrode Rx included in the display device DIS8 is formed between the front surface CVf and the back surface CVb of the cover member CV1.

In the case of the display device DIS8, the detection electrode Rx is formed in the cover member CV1, and therefore, a distance between the input tool CMD illustrated in FIGS. 4 and 9 to 11 and the detection electrode Rx is determined regardless of the thickness TH1 of the space LA1. However, even in the display device DIS8, the thickness TH1 of the space LA1 is reduced in some cases in order to thin a device. Therefore, if the Newton's rings appear by reducing the thickness TH1 of the space LA1, the visual recognition of the Newton's rings can be suppressed by applying the above-described technique.

If the reflection suppressing layer RC2 illustrated in FIGS. 19 and 20 is formed on the back surface CVb of the cover member CV1 as a modification example of the display device DIS8 illustrated in FIG. 22, a reflection suppressing layer RC2 is further stacked on an exposed surface of the resin layer OC3.

Although illustration is omitted, as still another modification example of the display device DIS8 illustrated in FIG. 22, the detection electrode Rx and the driving electrode Tx illustrated in FIG. 4 or the detection electrode EL illustrated in FIGS. 9 to 12 is formed between the cover member CV1 and the space LA1 in some cases. If the detection electrode Rx and the driving electrode Tx are formed, the driving electrode Tx and the plurality of electrodes Rx are stacked in a thickness direction through a dielectric layer DL as described with reference to, for example, FIG. 4. Alternatively, if the detection electrode Rx and the driving electrode Tx are formed, the driving electrode Tx and the detection electrode Rx may be formed in the same layer.

For example, the above-described various modification examples can also be applied in combination.

A category of an idea of the present invention can be thought up as various alteration examples and correction examples by those who skilled in the art, and it could be understood that these alteration examples and correction examples also belong to the scope of the present invention. For example, the scoped of the present invention includes ones obtained by appropriately adding, deleting, or performing design change of components to/from each embodiment described above, or adding, omitting, or performing a condition change of a process thereto/therefrom by those skilled in the art as long as they include the concept of the present invention.

The present invention can be used for a display device and an electronic apparatus in which the display device is embedded.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed as follows:

1. A display device comprising:
   a first substrate,
   a plurality of pixels arranged on the first substrate,
   a plurality of detection electrodes arranged on the pixels,
   a first member arranged on the detection electrodes,
   a cover member arranged on the first member,
   wherein the cover member having a first surface and a second surface positioned on an opposite side of the first surface,
   wherein the first member having a third surface opposing the second surface of the cover member through a first space; and
   wherein a thickness of the first space is 300 µm or smaller,
   wherein a first reflection suppressing layer which reduces reflected light is formed on the third surface of the first member, and
   wherein a second reflection suppressing layer which reduces reflected light is formed on at least one of the first surface of the cover member and the second surface of the cover member,
   wherein the first reflection suppressing layer and the second reflection suppressing layer have a light diffusion portion diffusing incident light irradiated from the first surface of the cover member in a plurality of directions.

2. The display device according to claim 1,
   wherein the second reflection suppressing layer is formed on the first surface of the cover member.

3. The display device according to claim 1,
   wherein the second reflection suppressing layer is formed on the second surface of the cover member.

4. The display device according to claim 1,
   wherein a surface of the first reflection suppressing layer opposing to the cover member has a higher surface roughness than other surface of the first reflection suppressing layer opposing to the first member.

5. The display device according to claim 1,
   wherein an exposed surface of the first reflection suppressing layer has a higher surface roughness than a bonding interface with the first member positioned on an opposite side of the exposed surface.

6. The display device according to claim 1,
   wherein the first reflection suppressing layer has a first light diffusion portion diffusing incident light irradiated from the first surface of the cover member, and the second reflection suppressing layer has a second light diffusion portion diffusing incident light irradiated from the first surface of the cover member.

7. The display device according to claim 1,
wherein a surface of the first reflection suppressing layer opposing to the cover member has a higher surface roughness than other surface of the first reflection suppressing layer opposing to the first member, and
wherein a surface of the second reflection suppressing layer opposing to the first member has a higher surface roughness than other surface of the second reflection suppressing layer opposing to the cover member.

8. The display device according to claim 1,
wherein a first exposed surface of the first reflection suppressing layer has a higher surface roughness than a bonding interface with the first member positioned on an opposite side of the first exposed surface, and
a second exposed surface of the second reflection suppressing layer has a higher surface roughness than a bonding interface with the cover member positioned on an opposite side of the second exposed surface.

9. The display device according to claim 1,
wherein a haze value of the first reflection suppressing layer is 26% or larger.

10. The display device according to claim 1,
wherein
a haze value of the first reflection suppressing layer is 28% or larger.

11. The display device according to claim 1,
wherein a separation distance between the second surface of the cover member and the third surface of the first member is smaller than a thickness of the cover member.

12. The display device according to claim 1,
wherein the first member is a polarizing plate polarizing transmitted light fed from the first surface of the cover member.

13. The display device according to claim 1,
wherein the second reflection suppressing layer is not formed on the first surface of the cover member.

14. The display device according to claim 1,
wherein the second reflection suppressing layer is not formed on the second surface of the cover member.

15. The display device according to claim 1,
wherein the cover member is a resin plate made of the resin material.

16. The display device according to claim 1,
wherein a haze value of the second reflection suppressing layer is 26% or larger.

17. The display device according to claim 1,
wherein a haze value of the second reflection suppressing layer is 28% or larger.

18. The display device according to claim 1,
wherein a thickness of the first member is 100 μm or smaller.

19. The display device according to claim 1,
wherein a thickness of the cover member is 1 mm to 2 mm.

* * * * *